US010181156B2

(12) United States Patent
Fox et al.

(10) Patent No.: US 10,181,156 B2
(45) Date of Patent: Jan. 15, 2019

(54) SYSTEM AND METHOD FOR AUTOMATED TRADE REPLICATION TRADE BUNDLING AND DETACHMENT

(71) Applicant: Ditto Holdings, Inc., Chicago, IL (US)

(72) Inventors: Joseph Fox, Chicago, IL (US); Brian Lund, Chicago, IL (US); David Hoak, Chicago, IL (US); Steve Mann, Chicago, IL (US); Cedric Charles, Chicago, IL (US); Adan Romero, Chicago, IL (US)

(73) Assignee: DITTO HOLDINGS, INC., Chicago, IL (US)

( * ) Notice: Subject to any disclaimer, the term of this patent is extended or adjusted under 35 U.S.C. 154(b) by 0 days.

(21) Appl. No.: 13/917,440

(22) Filed: Jun. 13, 2013

(65) Prior Publication Data

US 2014/0156486 A1 Jun. 5, 2014

Related U.S. Application Data

(60) Provisional application No. 61/659,103, filed on Jun. 13, 2012.

(51) Int. Cl.
*G06Q 40/04* (2012.01)
*G06Q 30/06* (2012.01)

(52) U.S. Cl.
CPC ......... *G06Q 40/04* (2013.01); *G06Q 30/0605* (2013.01)

(58) Field of Classification Search
CPC ............................... G06Q 40/00; G06Q 40/04
USPC ................................................. 705/37, 36 R
See application file for complete search history.

(56) References Cited

U.S. PATENT DOCUMENTS

| | | | | |
|---|---|---|---|---|
| 5,101,353 | A * | 3/1992 | Lupien et al. | 705/37 |
| 6,236,980 | B1 * | 5/2001 | Reese | 705/36 R |
| 7,424,303 | B2 | 9/2008 | Al-Sarawi | |
| 7,716,119 | B2 | 5/2010 | Cha | |
| 7,840,480 | B2 | 11/2010 | Kim-E | |
| 7,844,538 | B2 * | 11/2010 | Wallman | G06Q 40/04 705/37 |
| 8,069,106 | B2 | 11/2011 | Waelbroeck et al. | |
| 2002/0059127 | A1 * | 5/2002 | Brown | G06Q 40/04 705/36 R |
| 2003/0120575 | A1 | 6/2003 | Wallman | |

(Continued)

OTHER PUBLICATIONS

PCT International Search Report in International Application No. PCT/US13/45626 dated Nov. 22, 2013.

(Continued)

*Primary Examiner* — William E Rankins
(74) *Attorney, Agent, or Firm* — Barich IP Law Group

(57) ABSTRACT

A system and method for automated securities trading is provided. The system includes a lead trader account database, a follower account database, and a trade determination system. Trade information is received from a lead trader and a listing of followers for the lead trader is retrieved from the lead account database. For each follower, their account at the follower account database is accessed to confirm that they desire to participate in the lead trader's trade and that they have enough funds to do so. The lead trader and follower's traders are then grouped together and traded as a single trade. The traded shares are then provided to the lead trader and followers at the average price of the trade.

5 Claims, 19 Drawing Sheets

(56) References Cited

U.S. PATENT DOCUMENTS

| | | | | |
|---|---|---|---|---|
| 2004/0111352 | A1 | 6/2004 | Kim | |
| 2004/0210511 | A1 | 10/2004 | Waelbroeck et al. | |
| 2005/0004838 | A1 | 1/2005 | Perkowski | |
| 2005/0192888 | A1 | 9/2005 | Lennane | |
| 2005/0222938 | A1* | 10/2005 | Treacy | G06Q 40/04 705/37 |
| 2006/0265309 | A1* | 11/2006 | Sweeting et al. | 705/37 |
| 2008/0004894 | A1 | 1/2008 | Son | |
| 2009/0094152 | A1 | 4/2009 | Lopez | |
| 2010/0023459 | A1* | 1/2010 | Sundby | G06Q 40/04 705/36 R |
| 2011/0166982 | A1* | 7/2011 | Cole et al. | 705/37 |
| 2012/0022989 | A1 | 1/2012 | Vasinkevich | |
| 2013/0006827 | A1* | 1/2013 | Kaus | G06Q 40/00 705/37 |
| 2013/0060672 | A1* | 3/2013 | Assia | G06N 5/025 705/37 |
| 2013/0268423 | A1* | 10/2013 | Giles | G06Q 40/04 705/37 |

OTHER PUBLICATIONS

PCT Written Opinion of the International Searching Authority in International Application No. PCT/US13/45626 dated Nov. 22, 2013.

* cited by examiner

1200

Dashboard

Buying Power 1202

| | |
|---|---|
| CASH: | $ 23,016.15 |
| MARGIN: | $ 53,016.15 |
| DAY TRADING: | $ 113,016.15 |
| CURRENT ACCOUNT VALUE: | $ 29,834.55 |
| START OF DAY ACCOUNT VALUE: | $ 30,000.00 |

Daily Gain/Loss 1210

| | |
|---|---|
| UNREALIZED GAIN/LOSS: | 0.05 |
| REALIZED GAIN/LOSS: | -165.80 |
| TOTAL: | -165.75 |

The Markets 1212

| | | | |
|---|---|---|---|
| DOW | 12,820.79 | 104.86 | 0.82% |
| S&P | 1,370.41 | 11.82 | 0.87% |
| NASDAQ | 3,015.55 | 24.33 | 0.81% |

Trade Entry | Add | Hide

Trading Style: Share for Share 1204

| SYMBOL Click "O" for options | LAST | CHANGE | BID | ASK | SHARES | ORDER | PRICE TYPE | ENTRY | STOP | TARGET | SUBMIT | CANCEL |
|---|---|---|---|---|---|---|---|---|---|---|---|---|
| NEE | 62.35 | 0.10 | 62.35 | 62.36 | 100 | Buy | Limit Day | 62.35 | 62.85 | 63.75 | | |

SAVE

Open Orders | Hide 1206 Show All

| SYMBOL | QTY | FILLED | LAST | CHANGE | ORDER TYPE | PRICE TYPE | PRICE | STOP LIMIT | TIME FORCE | STATUS | UPDATE | CANCEL |
|---|---|---|---|---|---|---|---|---|---|---|---|---|
| GE | 30 | 0 | 19.09 | 0.35 | SELL | STOP | 18.25 | none | GTC | Open | | |
| GE | 30 | 0 | 19.09 | 0.35 | SELL | LIMIT | 21.21 | none | GTC | Open | | |
| MSFT | 25 | 0 | 30.39 | -0.08 | SELL | STOP | 27.50 | none | GTC | Open | | |
| MSFT | 25 | 0 | 30.39 | -0.08 | SELL | LIMIT | 33.40 | none | GTC | Open | | |

Current Positions 1208

| SYMBOL | QTY | LAST | CHANGE | BID | ASK | ENTRY | STOP | STOP LIMIT | TARGET | UPDATE | LOSS/GAIN | CLOSE MKT |
|---|---|---|---|---|---|---|---|---|---|---|---|---|
| GE | 30 | 19.09 | 0.35 | 19.09 | 19.10 | 19.13 | 18.25 | none | 21.21 | | -1.20 | |
| MSFT | 25 | 30.39 | -0.08 | 30.39 | 30.40 | 30.34 | 27.50 | none | 33.40 | | 1.25 | |

Daily Transactions | Hide 1214 Show Canceled Order

| TIME | SYMBOL | QTY | FILLED | TYPE | PRICE | AVG PRICE | AMOUNT | STATUS | TIF |
|---|---|---|---|---|---|---|---|---|---|
| 13:34:59 | C | 35 | 35 | MARKET SELL | $ 33.65 | $ 33.66 | $ 1,178.10 | Filled | DAY |
| 13:34:43 | C | 35 | 35 | MARKET BUY | $ 33.65 | $ 33.65 | $ 1,177.75 | Filled | DAY |
| 13:31:54 | MSFT | 25 | 25 | MARKET BUY | $ 30.34 | $ 30.34 | $ 758.50 | Filled | DAY |
| 13:31:34 | GE | 30 | 30 | MARKET BUY | $ 19.13 | $ 19.13 | $ 573.90 | Filled | DAY |
| 13:31:22 | GE | 50 | 50 | MARKET SELL | $ 19.14 | $ 19.14 | $ 957.00 | Filled | DAY |
| 13:31:19 | C | 100 | 100 | MARKET SELL | $ 33.75 | $ 33.74 | $ 3,374.00 | Filled | DAY |
| 13:30:39 | MSFT | 30 | 30 | MARKET SELL | $ 30.39 | $ 30.39 | $ 911.70 | Filled | DAY |
| 13:24:38 | C | 100 | 100 | MARKET BUY | $ 33.77 | $ 33.77 | $ 3,377.00 | Filled | DAY |

Buying Power 1802

| | |
|---|---|
| CASH: | $ 23,016.15 |
| MARGIN: | $ 53,016.15 |
| DAY TRADING: | $ 113,016.15 |
| CURRENT ACCOUNT VALUE: | $ 29,834.55 |
| START OF DAY ACCOUNT VALUE: | $ 30,000.00 |

Daily Gain/Loss 1812

| | |
|---|---|
| UNREALIZED GAIN/LOSS: | 0.05 |
| REALIZED GAIN/LOSS: | -165.80 |
| TOTAL: | -165.75 |

The Markets 1814

| | | | |
|---|---|---|---|
| DOW | 12,820.79 | 104.86 | 0.82% |
| S&P | 1,370.41 | 11.82 | 0.87% |
| NASDAQ | 3,015.55 | 24.33 | 0.81% |

Trade Entry | Add | Hide
Trading Style: Share for Share 1804

| SYMBOL | Click "O" for options | LAST | CHANGE | BID | ASK | SHARES | ORDER | PRICE TYPE | ENTRY | STOP | TARGET | SUBMIT | CANCEL |
|---|---|---|---|---|---|---|---|---|---|---|---|---|---|
| NEE | | 62.35 | 0.10 | 62.35 | 62.36 | 100 | Buy | Limit Day | 62.35 | 62.85 | 63.75 | | |

SAVE

Open Orders | Hide 1806 Show All

| SYMBOL | QTY | FILLED | LAST | CHANGE | ORDER TYPE | PRICE TYPE | PRICE | STOP LIMIT | TIME FORCE | STATUS | UPDATE | CANCEL |
|---|---|---|---|---|---|---|---|---|---|---|---|---|
| GE | 30 | 0 | 19.09 | 0.35 | SELL | STOP | 18.25 | none | GTC | Open | | |
| GE | 30 | 0 | 19.09 | 0.35 | SELL | LIMIT | 21.21 | none | GTC | Open | | |
| MSFT | 25 | 0 | 30.39 | -0.08 | SELL | STOP | 27.50 | none | GTC | Open | | |
| MSFT | 25 | 0 | 30.39 | -0.08 | SELL | LIMIT | 33.40 | none | GTC | Open | | |

Current Positions 1808

| SYMBOL | QTY | LAST | CHANGE | BID | ASK | ENTRY | STOP | STOP LIMIT | TARGET | UPDATE | LOSS/GAIN | CLOSE MKT |
|---|---|---|---|---|---|---|---|---|---|---|---|---|
| GE | 30 | 19.09 | 0.35 | 19.09 | 19.10 | 19.13 | 18.25 | none | 21.21 | | -1.20 | |
| MSFT | 25 | 30.39 | -0.08 | 30.39 | 30.40 | 30.34 | 27.50 | none | 33.40 | | 1.25 | |

Daily Transactions | Hide 1810 Show Canceled Orders

| TIME | SYMBOL | QTY | FILLED | TYPE | PRICE | AVG PRICE | AMOUNT | STATUS | TIF |
|---|---|---|---|---|---|---|---|---|---|
| 13:34:59 | C | 35 | 35 | MARKET SELL | $ 33.65 | $ 33.66 | $ 1,178.10 | Filled | DAY |
| 13:34:43 | C | 35 | 35 | MARKET BUY | $ 33.65 | $ 33.65 | $ 1,177.75 | Filled | DAY |
| 13:31:54 | MSFT | 25 | 25 | MARKET BUY | $ 30.34 | $ 30.34 | $ 758.50 | Filled | DAY |
| 13:31:34 | GE | 30 | 30 | MARKET BUY | $ 19.13 | $ 19.13 | $ 573.90 | Filled | DAY |
| 13:31:22 | GE | 50 | 50 | MARKET SELL | $ 19.14 | $ 19.14 | $ 957.00 | Filled | DAY |
| 13:31:19 | C | 100 | 100 | MARKET SELL | $ 33.75 | $ 33.74 | $ 3,374.00 | Filled | DAY |
| 13:30:39 | MSFT | 30 | 30 | MARKET SELL | $ 30.39 | $ 30.39 | $ 911.70 | Filled | DAY |
| 13:24:38 | C | 100 | 100 | MARKET BUY | $ 33.77 | $ 33.77 | $ 3,377.00 | Filled | DAY |

FIG. 18

SYSTEM AND METHOD FOR AUTOMATED TRADE REPLICATION TRADE BUNDLING AND DETACHMENT

CROSS REFERENCE TO RELATED APPLICATIONS

This application claims the benefit of U.S. Provisional Application No. 61/659,103, filed Jun. 13, 2012, which is hereby incorporated by reference in its entirety.

BACKGROUND

Generally, the present invention relates to systems and methods for securities trading. More specifically, the present invention relates to systems and method for automated securities trading.

Individuals trading securities often seek advice and guidance with regard to particular trades. Advice may be provided directly to the individuals by brokers, advisors, newsletters, or advisory services, for example. When using one or more of these sources of advice or guidance, the individual trading securities typically must first obtain the source of information and then determine and execute their own individual trade based on the information. Unfortunately, the amount of time this requires may result in a significant enough time lag to adversely impact the financial opportunity presented by the source of advice or guidance. Further, in today's fast-trading environment, a delay of seconds may be sufficient for a financial opportunity presented by a trade to significantly degrade.

On the other end of the spectrum from individual trading are pooled trading funds wherein the trades may be executed by someone other than the individual, such as by the manager of a hedge fund, for example. A specialized manager may have greater skill at securities trading than the individual and may thus be able to deliver more profitable trades than the individual may achieve on their own. However, with such managed funds, the individual owning the shares often does not have input or insight into the trading process and their ability to manage their own portfolio is extremely minimal.

BRIEF DESCRIPTION OF THE DRAWINGS

FIG. 12 is an embodiment of a Lead Trader Dashboard.

FIG. 18 is an alternative embodiment of a Lead Trader Dashboard.

Figure 1:
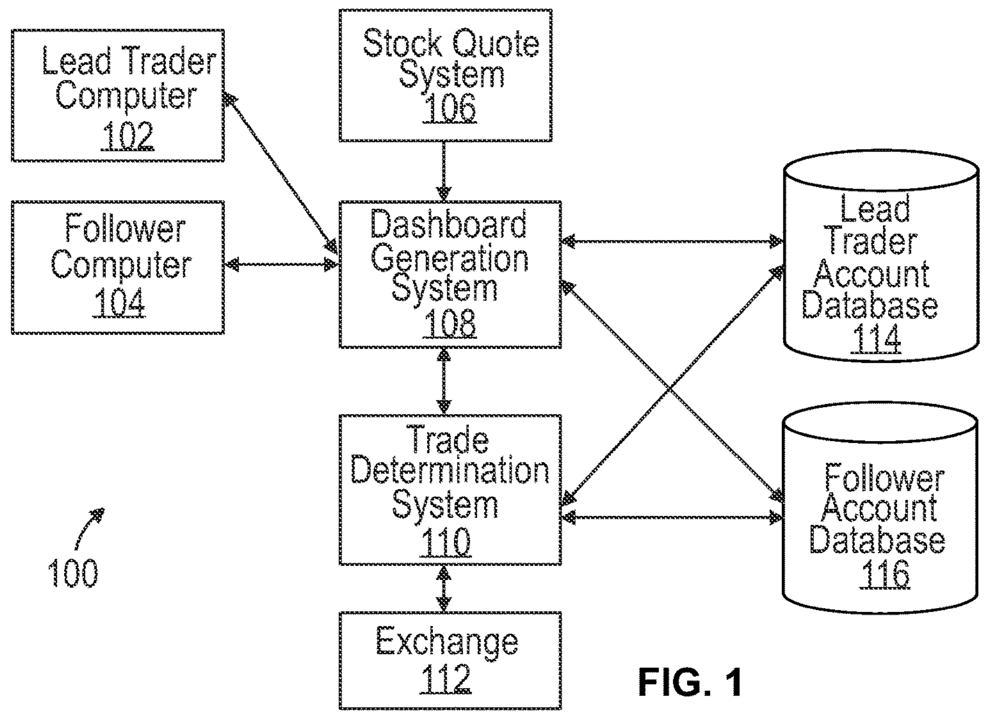
FIG. 1 illustrates an embodiment of a system for automated trade bundling.

The following description of certain embodiments will be better understood when read in conjunction with the appended drawings. For the purposes of illustration, certain embodiments are shown in the drawings. It should be understood, however, that the claims are not limited to the embodiments shown in the attached drawings.

SUMMARY OF INVENTION

In one embodiment, a system and method for automated securities trading may include a Lead Trader account database, a follower account database, and a trade determination system. Trade information may be received from a Lead Trader and a listing of followers for the Lead Trader is retrieved from the lead account database. For each Follower, their account at the follower account database may be accessed to confirm that they desire to participate in the Lead Trader's trade and that they have enough funds to do so. The Lead Trader and follower traders are then grouped together and traded as a single trade. The traded shares are then provided to the Lead Trader and followers at the average price of the trade.

In one embodiment, a system for automated trade bundling allows Followers to attach to Lead Traders and to follow the trades made by the Lead Traders. A Lead Trader may register before Followers are permitted to follow trades made by the Lead Trader. Additionally, Followers may register before they are permitted to follow trades made by the Lead Trader.

After Lead Traders are registered, they may be made available for following by Followers. After Followers are registered, they may request to follow trades made by Lead Traders. Additionally, Followers may be approved by a Lead Trader before they are permitted to follow trades made by the Lead Trader. After a Follower is approved, the Follower may begin following trades made by the Lead Trader.

When a Lead Trader submits a trade, the system may determine a list of Followers who are following the Lead Trader. Then, for each Follower, the system may determine if the Follower is fully following the Lead Trader. If not, then the system may generate and send a message to the Follower that the Lead Trader is making a trade and that the Follower is not participating in that trade.

If the Follower is fully following the Lead Trader, the system may then determine if the Follower has chosen to follow trades involving the particular security being traded by the Lead Trader. If not, then the system may generate and send a message to the Follower that the Lead Trader is making a trade and that the Follower is not participating in that trade.

If the Follower is following trades involving the particular security being traded by the Lead Trader, then the system may determine if the Follower is permitted to trade the security being traded by the Lead Trader. In some circumstances, Followers may not be able to trade certain securities, like options, for example. If the Follower is not permitted to trade the security being traded by the Lead Trader, then the system may generate and send a message to the Follower that the Lead Trader is making a trade and that the Follower is not participating in that trade.

If the Follower is permitted to trade the security being traded by the Lead Trader, then the system may determine how many shares the Follower will be able to trade. The Follower may elect to follow the Lead Trader share-for-share or percent-for-percent. Under the share-for-share method, the Follower has elected to trade the same number of shares as the Lead Trader. When the Follower has elected to follow the Lead Trader share-for-share, the system may determine how much the trade would cost the Follower and then determine if the Follower has enough money in his or her account to participate in the trade. If the Follower does not have enough money to participate, the system may reduce the number of shares the Follower trades based on the Follower's available account balance. If the Follower has enough money to participate, then the Follower will trade the same number of shares as the Lead Trader.

Under the percent-for-percent method, the Follower has elected to trade a percentage of their available account balance that is equal to the percentage of the Lead Trader's available account balance that the Lead Trader is trading. Under the percent-for-percent method, the system may first determine what percentage of the Lead Trader's available account balance the Lead Trader is trading. Then, the system may apply that percentage to the Follower's available account balance to determine how many shares the Follower will be trading.

The system may then determine the number of shares that each Follower following the Lead Trader will be trading. At that point, the system adds up the number of shares each Follower will be trading and then adds that sum to the number of shares that the Lead Trader is trading. The system then transmits the total trade to an Exchange for execution.

The shares traded on an Exchange may be traded at different times and thus possibly at different prices. The Exchange may send a message back to notify the system that the trade has occurred, to identify what security was traded, how many shares were traded, and at what price they were traded.

The system may receive the message and then may determine the average price of the shares traded. To do this, the system may add up the price at which each share was traded and then divide that by the total number of shares traded.

After the system has determined the average price of the shares traded, the system may store the number of shares traded for each Follower along with the average share price in the Follower's account, which may be stored in a database. The system may also store the number of shares traded by the Lead Trader and the average share price in the Lead Trader's account, which may also be stored in a database.

The system may also allow a Follower to duplicate the portfolio of a selected Lead Trader. To do this, a Follower may first request to duplicate the portfolio of a Lead Trader. The system may then retrieve the identity and number of shares held by the Lead Trader from the Lead Trader's account. The system may then determine the value of the Lead Trader's portfolio by multiplying the number of shares by the current share price for each security held by the Lead Trader. The system may then determine if the Follower has enough money to duplicate the Lead Trader's portfolio. If the Follower does not have enough money to duplicate the Lead Trader's portfolio, the system may generate and send a message to the Follower. If the Follower has enough money to duplicate the Lead Trader's portfolio, the system may submit a trade to the Exchange. The trade may be executed on the Exchange. After the trade is executed, the Exchange may transmit a message back to the system including the identity of the security or securities traded, the number of each security traded, and the price of each security traded.

The system may receive the message from the Exchange and may then store the identity of each security traded, the number of shares traded for each security, and the price of each security traded in the Follower's account.

After the system has determined the average price of the shares traded, the system may store the number of shares traded for each Follower along with the average share price in the Follower's account, which may be stored in a database. The system may also store the number of shares traded by the Lead Trader and the average share price in the Lead Trader's account, which may also be stored in a database.

DETAILED DESCRIPTION

FIG. 1 illustrates an embodiment of a system for automated trade bundling 100. The system for automated trade bundling 100 may include a Lead Trader Computer 102, a Follower Computer 104, a Stock Quote System 106, a Dashboard Generation System 108, a Trade Determination System 110, an Exchange 112, a Lead Trader Account Database 114, and a Follower Account Database 116.

The Lead Trader Computer 102 may be in communication with the Dashboard Generation System 108. The Follower Computer 104 may be in communication with the Dashboard Generation System 108. The Stock Quote System 106 may be in communication with the Dashboard Generation System 108. The Trade Determination System 110 may be in communication with the Dashboard Generation System 108. The Exchange 112 may be in communication with the Trade Determination System 110. The Lead Trader Account Database 114 may be in communication with the Dashboard Generation System 108. The Follower Account Database 116 may be in communication with the Dashboard Generation System 108. The Lead Trader Account Database 114 may be in communication with the Trade Determination System 110. The Follower Account Database 116 may be in communication with the Trade Determination System 110.

In operation, a Lead Trader (not shown) may enter trade parameters including a share identification that identifies the specific security to be traded by the Lead Trader, a Lead Trader share number representing the number of shares to be traded by the Lead Trader, and a Lead Trader share price of the security to be traded into the Lead Trader Computer 102. The Lead Trader Computer 102 may transmit the share identification, Lead Trader share number, Lead Trader share price, and Lead Trader identification to the Dashboard Generation System 108. The Dashboard Generation System 108 may receive the share identification, Lead Trader share number, Lead Trader share price, and Lead Trader identification from the Lead Trader Computer 102.

The Dashboard Generation System 108 may transmit the share identification, Lead Trader share number, Lead Trader share price, and Lead Trader identification to the Trade Determination System 110. The Trade Determination System 110 may receive the share identification, Lead Trader share number, Lead Trader share price, and Lead Trader identification from the Dashboard Generation System 108.

In one or more embodiments, the Dashboard Generation System 108 may use the share identification to retrieve the Lead Trader share price from the Stock Quote System 106. The Dashboard Generation System 108 may then transmit the Lead Trader share price to the Trade Determination System 110.

The Trade Determination System 110 may then use the Lead Trader identification to identify a list of Follower identifications associated with the Lead Trader identification in the Lead Trader Account Database 114. The Trade Determination System 110 may then retrieve the list of Follower identifications associated with the Lead Trader identification from the Lead Trader Account Database 114. The list of Follower identifications associated with the Lead Trader identification in the Lead Trader Account Database 114 may include one or more Follower identifications.

The Trade Determination System 110 identifies the first Follower identification on the list of Follower identifications associated with the Lead Trader identification. For the first Follower identification on the list, the Trade Determination System 110 may use the Follower identification to access a Follower account associated with said first Follower identification in the Follower Account Database 116. The Trade Determination System 110 may then retrieve a full follow indicator associated with said first Follower identification from the Follower Account Database 116.

If the full follow indicator indicates that full following is not set for the first Follower identification, the Trade Determination System 110 may generate an electronic message for the first Follower identification. For example, when the Trade Determination System 110 determines that the full follow indicator is set to off, the Trade Determination System 110 uses the first Follower identification to retrieve an e-mail address associated with the first Follower identification in the Follower Account Database 116. The Trade Determination System 110 then forms an e-mail message by combining predetermined text with the share identification, Lead Trader share number, Lead Trader share price, and Lead Trader identification. In one embodiment, the predetermined text may state that the Follower is not participating in this trade because the Follower is not fully following the Lead Trader. The Trade Determination System 110 may then send the electronic message to an e-mail address associated with the first Follower identification.

In one or more alternative embodiments, the Trade Determination System 110 may also then add the first Follower identification to a Non-Following Follower list.

If the full follow indicator indicates that full following is set for the first Follower identification, the Trade Determination System 110 then retrieves an authorized security type indicator associated with the first Follower identification in the Follower Account Database 116.

The Trade Determination System 110 then determines if the authorized security type indicator indicates whether the first Follower identification is authorized or not to trade in a specific security type. For example, the authorized security type indicator may indicate that the first Follower account is not authorized to trade options. In one embodiment, the Trade Determination System 110 identifies whether a share identification includes five characters, as a typical option may.

If the authorized security type indicator indicates that the first Follower identification is not authorized to trade the security type associated with the share identification, then the Trade Determination System 110 generates an electronic message for the first Follower identification. For example, when the Trade Determination System 110 determines that the authorized security type indicator indicates that the first Follower identification is not authorized to trade the security type associated with the share identification, the Trade Determination System 110 uses the first Follower identification to retrieve an e-mail address associated with the first Follower identification in the Follower Account Database 116. The Trade Determination System 110 then forms an e-mail message by combining predetermined text with the share identification, Lead Trader share number, Lead Trader share price, and Lead Trader identification. In one embodiment, the predetermined text states that the trade was not performed because it was directed to a non-authorized security type. The Trade Determination System 110 may then send the electronic message to an e-mail address associated with the first Follower identification.

If the authorized security type indicator indicates that the first Follower identification is authorized to trade the security type associated with the share identification, then the Trade Determination System 110 retrieves a list of deselected individual share identifications associated with the first Follower identification in the Follower Account Database 116. The Trade Determination System 110 then determines if the share identification matches any of the deselected individual share identifications on the list.

If the share identification matches any of the deselected individual share identifications on the list, the Trade Determination System 110 generates an electronic message for the first Follower identification. For example, when the Trade Determination System 110 determines that the share identification matches one of the deselected individual share identifications on the list, the Trade Determination System 110 uses the first Follower identification to retrieve an e-mail address associated with the first Follower identification in the Follower Account Database 116. The Trade Determination System 110 then forms an e-mail message by combining predetermined text with the share identification, Lead Trader share number, Lead Trader share price, and Lead Trader identification. In one embodiment the predetermined text states that the Follower is not participating in this trade because the security being traded by the Lead Trader was on the Follower's list of deselected shares. The Trade Determination System 110 may then send the electronic message to an e-mail address associated with the first Follower identification.

If the share identification does not match any of the deselected individual share identifications on the list, the Trade Determination System 110 may retrieve the available Follower account balance associated with the first Follower identification in the Follower Account Database 116.

The Trade Determination System 110 may retrieve a share calculation method indicator associated with the first Follower identification from the Follower Account Database 116. The share calculation method indicator may indicate whether the first Follower account is set to trade share-for-share or percent-for-percent.

In one or more embodiments where the share calculation method indicator associated with the first Follower identification is share-for-share, the Trade Determination System 110 may set an initial Follower share number equal to the Lead Trader share number.

The Trade Determination System 110 then multiplies the initial Follower share number by the Lead Trader share price to determine the Follower trade total price.

The Trade Determination System 110 then compares the available Follower account balance to the Follower trade total price.

If the Trade Determination System 110 determines that the available Follower account balance is greater than or equal to the Follower trade total price, then the Trade Determination System 110 may set an approved Follower share number equal to the initial Follower share number.

If the Trade Determination System 110 determines that the available Follower account balance is less than the Follower trade total price, then the Trade Determination System 110 may divide the available Follower account balance by the Lead Trader share price to determine a reduced Follower share number. The Trade Determination System 110 may then set the approved Follower share number equal to the reduced Follower share number.

In one or more embodiments where the share calculation method is percent-for-percent, the Trade Determination System 110 may retrieve the available Lead Trader account balance associated with the Lead Trader identification from the Lead Trader Account Database 114. The Trade Determination System 110 may then multiply the Lead Trader share number by the Lead Trader share price to determine a Lead Trader trade value. The Trade Determination System 110 may then divide the Lead Trader trade value by the available Lead Trader account balance to determine the Lead Trader trade percentage.

After the Trade Determination System 110 has determined the Lead Trader trade percentage, the Trade Determination System 110 may then multiply the available Follower account balance by the Lead Trader trade percentage to determine the Follower account trade value.

The Trade Determination System 110 may then divide the Follower account trade value by the Lead Trader share price to determine the approved Follower share number.

In one or more embodiments where multiple Follower identifications associated with the Lead Trader identification in the Lead Trader Account Database 114, the Trade Determination System 110 may then perform one or more of the functions described above for each Follower identification associated with the Lead Trader identification in the Lead Trader Account Database 114. In an embodiment, a participating Follower identification list is generated and may include each Follower identification that has an approved Follower share number not equal to zero.

After the Trade Determination System 110 has determined the approved Follower share number for each Follower identification on the participating Follower identifications list, the Trade Determination System 110 may determine the total trade share number. To do this, in one or more embodiments the Trade Determination System 110 sums the approved Follower share number for each Follower identification on the participating Follower identifications list to determine a total approved Follower share number.

After the Trade Determination System 110 has determined the total approved Follower share number, the Trade Determination System 110 may add the Lead Trader share number to the total approved Follower share number to determine the total trade share number.

After the Trade Determination System 110 has determined the total trade share number, the Trade Determination System 110 may transmit the share identification and total trade share number to the Exchange 112. In one or more embodiments, the Exchange may include the New York Stock Exchange, American Stock Exchange, NASDAQ, or any other exchange that facilitates securities trading.

After the trade has been executed at the Exchange 112, the Exchange 112 may send a notification back to the Trade Determination System 110 that the trade has been completed. The message from the Exchange 112 may include the total number of shares traded and the traded share price for each share traded.

The Trade Determination System 110 may receive the message from the Exchange 112 that may include the total number of shares traded and the traded share price for each share traded.

In some instances, all of the shares in the total trade share number may not be traded at the same time at the Exchange, so the shares may have been traded at different prices. The Trade Determination System 110 then determines the average traded share price by multiplying the number of shares traded by the traded share price for each trade, adding them together, and then dividing by the total number of shares traded.

In an alternative embodiment, the Trade Determination System 110 may determine the average traded share price by adding up the traded share price for each share traded and then dividing by the total number of shares traded.

After the average traded share price has been determined, for each Follower identification on the participating Follower identifications list, the Trade Determination System 110 may locate the Follower account in the Follower Account Database 116 using the Follower identification and may store the approved Follower share number and the average traded share price in the Follower Account Database 116 for each Follower identification.

The Trade Determination System 110 may also locate the Lead Trader account in the Lead Trader Account Database 114 using the Lead Trader identification and may store the Lead Trader share number and average traded share price to the Lead Trader Account Database 114.

In an embodiment, after the Trade Determination System 110 has stored the Lead Trader share number and average share price in the Lead Trader Account Database 114, the Trade Determination System 110 may generate an electronic message to alert Followers that the Lead Trader completed the trade. For each Follower identification associated with the Lead Trader identification in the Lead Trader Account Database 114, the Trade Determination System 110 retrieves an e-mail address associated with each Follower identification from the Follower Account Database 116. The Trade Determination System 110 may then generate an electronic message with predetermined text along with the share identification and average traded share price. The predetermined text may state that the Lead Trader has just traded a security.

Figure 20:
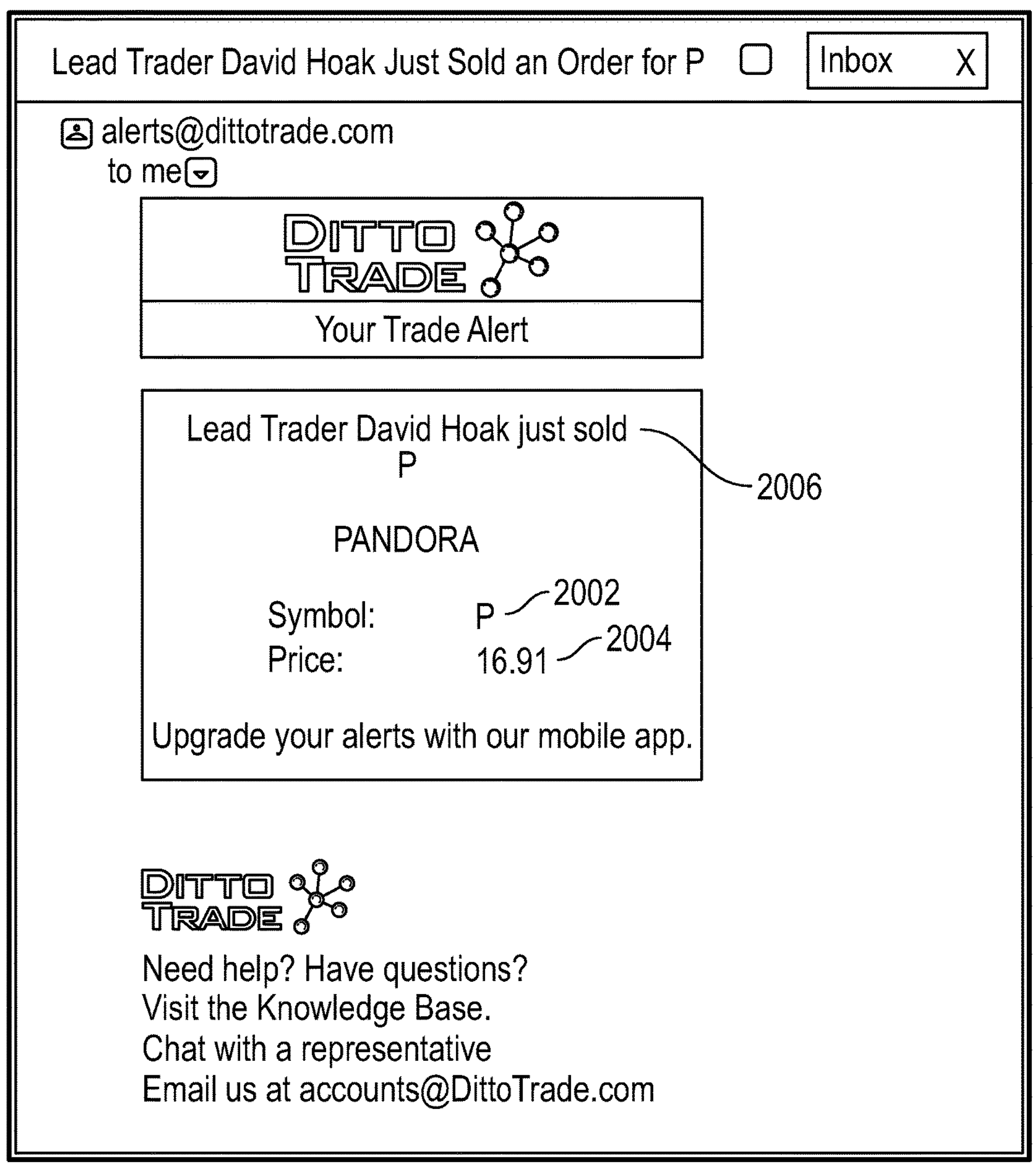
FIG. 20 is an embodiment of an electronic message.

FIG. 20 is an embodiment of an electronic message 2000. Electronic message 2000 includes a share identification 2002, the average traded share price 2004, and predetermined text 2006.

Figure 2:
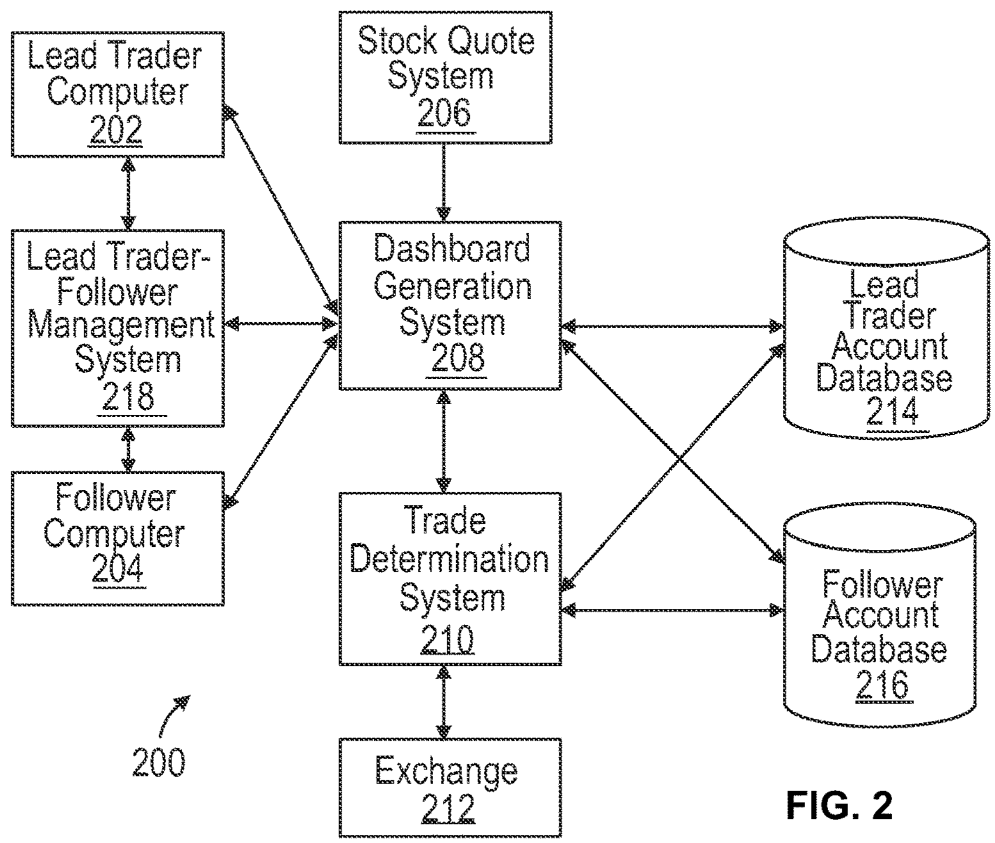
FIG. 2 illustrates an alternative embodiment of a system for automated trade bundling.

FIG. 2 illustrates an alternative embodiment of a system for real-time trade bundling 200. System 200 may include a Lead Trader Computer 202, a Follower Computer 204, a Stock Quote System 206, a Dashboard Generation System 208, a Trade Determination System 210, an Exchange 212, a Lead Trader Account Database 214, a Follower Account Database 216, and a Lead Trader-Follower Management System 218.

The Lead Trader Computer 202 may be in communication with the Dashboard Generation System 208. The Follower Computer 204 may be in communication with the Dashboard Generation System 208. The Stock Quote System 206 may be in communication with the Dashboard Generation System 208. The Trade Determination System 210 may be in communication with the Dashboard Generation System 208. The Exchange 212 may be in communication with the Trade Determination System 210. The Lead Trader Account Database 214 may be in communication with the Dashboard Generation System 208. The Follower Account Database 216 may be in communication with the Dashboard Generation System 208. The Lead Trader Account Database 214 may be in communication with the Trade Determination System 210. The Follower Account Database 216 may be in communication with the Trade Determination System 210. The Lead Trader Computer 202 may be in communication with the Lead Trader-Follower Management System 218. The Follower Computer 204 may be in communication with the Lead Trader-Follower Management System 218. The Lead Trader-Follower Management System 218 may be in communication with the Dashboard Generation System 208.

In operation, a Lead Trader may register through the Lead Trader-Follower Management System 218. To do this, the Lead Trader may enter Lead Trader registration information including Lead Trader name, Lead Trader contact information including a Lead Trader e-mail address, and a Lead Trader account password into the Lead Trader Computer 202.

The Lead Trader Computer 202 may then transmit the Lead Trader registration information to the Lead Trader-Follower Management System 218. The Lead Trader-Follower Management System 218 may receive the Lead Trader registration information from the Lead Trader Computer 202. The Lead Trader registration information may be reviewed and approved in the Lead Trader-Follower Management System 218. For example, approval may include verifying the identity of the Lead Trader, verifying licenses of the Lead Trader, and/or verifying capital requirement compliance with the Lead Trader.

After the Lead Trader has been approved, the Lead Trader-Follower Management System 218 may transmit the Lead Trader registration information to the Dashboard Generation System 208. In one or more embodiments, the Lead Trader-Follower Management System 218 may generate a Lead Trader identification which may uniquely identify the Lead Trader. In one or more embodiments, the Lead Trader-Follower Management System 218 may transmit a Lead Trader identification to the Dashboard Generation System 208. In one or more embodiments, the Lead Trader-Follower Management System 218 may transmit a Lead Trader identification along with the Lead Trader registration information to the Dashboard Generation System 208.

The Dashboard Generation System 208 may receive the Lead Trader registration information and/or Lead Trader identification from the Lead Trader-Follower Management System 218.

After the Dashboard Generation System 208 has received the Lead Trader registration information and/or Lead Trader identification, the Dashboard Generation System 208 may store the Lead Trader registration information and/or Lead Trader identification in the Lead Trader Account Database 214.

The Lead Trader-Follower Management System 218 may also generate an electronic message to notify the Lead Trader that the Lead Trader has been approved. The electronic message may be sent to the Lead Trader e-mail address. The electronic message may include a URL linking to a webpage that allows the Lead Trader to enter and/or edit Lead Trader profile information including a Lead Trader biography, Lead Trader trading strategies, or past Lead Trader returns, or other Lead Trader information.

After the Lead Trader has entered Lead Trader profile information, the Lead Trader-Follower Management System 218 may generate a URL linking to a webpage that displays the Lead Trader profile information.

In one or more embodiments, the Lead Trader-Follower Management System 218 may communicate an electronic alert to Followers that the new Lead Trader has been added, such as by sending an e-mail to the Followers by retrieving Follower e-mail addresses stored in the Follower Account Database 216. In one or more embodiments, the Lead Trader-Follower Management System 218 may include Lead Trader profile information about the electronic alert.

The Lead Trader-Follower Management System 218 may make the Lead Trader available for following by making the Lead Trader profile viewable on a public website. In one or more embodiments, the website may include a link to request to follow the Lead Trader.

The Follower may identify a Lead Trader that the Follower wishes to follow. The Follower may enter a request to follow a Lead Trader into the Follower Computer 204. The Follower Computer 204 may transmit the request to follow a Lead Trader to the Lead Trader-Follower Management System 218. The Lead Trader-Follower Management System 218 may receive the request to follow a Lead Trader from the Follower Computer 204. Alternatively, the Follower may click the link to request to follow the Lead Trader on the website displayed on the Follower Computer 204.

In an alternative embodiment, a Follower may first register through the Dashboard Generation System 208. To proceed with registration, the Follower may enter a Follower registration request and Follower registration information into the Follower Computer 204. The Follower Computer 204 may transmit the Follower registration request and Follower registration information to the Dashboard Generation System 208. The Dashboard Generation System 208 may receive the Follower registration request from the Follower Computer 204. The Dashboard Generation System 208 may then generate a Follower identification for the new Follower.

After the Dashboard Generation System 208 has generated a Follower identification, the Dashboard Generation System 208 may transmit the new Follower identification to the Follower Account Database 216 along with Follower registration information.

After receiving the request to follow a Lead Trader, the Lead Trader-Follower Management System 218 may transmit the request to follow a Lead Trader to the Lead Trader Computer 202 for approval. The Lead Trader Computer 202 may receive the request to follow a Lead Trader from the Lead Trader-Follower Management System 218 and may display the request.

The Lead Trader may review the request to follow the Lead Trader on the Lead Trader Computer 202 and decide whether to approve or reject the request. The Lead Trader may then enter an approval indicator into the Lead Trader Computer 202. The approval indicator may indicate that the request to follow was approved or denied.

Lead Trader Computer 202 may then transmit the approval indicator to the Lead Trader-Follower Management System 218. The Lead Trader-Follower Management System 218 may receive the approval indicator.

If the approval indicator indicates that the request was denied by the Lead Trader, the Lead Trader-Follower Management System 218 may generate an electronic message such as an e-mail to the Follower that the Follower's request was denied.

If the approval indicator indicates that the request was approved by the Lead Trader, the Lead Trader-Follower Management System may transmit the Lead Trader identification and the Follower identification to the Dashboard Generation System 208. The Dashboard Generation System 208 may receive the Lead Trader identification and the Follower identification.

After the Dashboard Generation System 208 has received the Lead Trader identification and Follower identification, the Dashboard Generation System 208 may access the Lead Trader account in the Lead Trader Account Database 214 using the Lead Trader identification. The Dashboard Generation System 208 may then add the Follower identification to the list of Follower identifications associated the Lead Trader account in the Lead Trader Database 214.

The Dashboard Generation System 208 may also access the Follower account in the Follower Account Database 216 using the Follower identification. The Dashboard Generation System 208 may then add the Lead Trader identification to the list of Lead Trader identifications of Lead Traders the Follower is following in the Follower Account Database 216.

In another embodiment, a Lead Trader may be an Advisor. An Advisor is similar to a Lead Trader but differs in that the Advisor does not participate in trades but rather recommends trades to Followers.

A Follower may register to follow the advisory trading service. A Follower may enter an advisory trading indicator into the Follower Computer 204. The Follower Computer 104 may then transmit the advisory trading indicator and advisory trading Follower identification to the Dashboard Generation System 208.

The Dashboard Generation System 208 may receive the advisory trading indicator and advisory trading Follower identification from the Follower Computer 204. The Dashboard Generation System 208 then accesses the Follower account in the Follower Account Database 216 using the Follower identification and stores the advisory trading indicator in the Follower Account Database 216 and associates the advisory trading indicator with the advisory trading Follower identification.

In one embodiment, an Advisor may enter advisory trading information including advisory trading share identification, advisory trading share number, and advisory trading share price into an Advisor Computer. In this embodiment, Lead Trader Computer 302 may be an Advisor Computer. The Advisor Computer may then transmit the advisory trading information including advisory trading share identification, advisory trading share number, and advisory trading share price to the Trade Determination System 210.

In one embodiment, the Trade Determination System 210 may generate advisory trading information including advisory trading share identification, advisory trading share number, and advisory trading share price.

The Trade Determination System 210 may then access the Follower Account Database 216 and may retrieve an advisory trading Follower identification list including advisory trading Follower identifications associated with an advisory trading indicator in the Follower Account Database 216.

For a first advisory trading Follower identification, the Trade Determination System 210 may determine an approved advisory trading Follower share number. To do this, the Trade Determination System 210 may access the advisory trading Follower account in the Follower Account Database 216 using the first advisory trading Follower identification. The Trade Determination System 210 may then retrieve a full advisory trading follow indicator from the Follower Account Database 216 associated with the first advisory trading Follower identification.

If the full advisory trading follow indicator indicates that the first advisory trading Follower identification is not fully following advisory trading, then the Trade Determination System 210 may generate an electronic message for the first advisory trading Follower identification. For example, when the Trade Determination System 210 determines that the full advisory trading follow indicator is set to off, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. In one embodiment the predetermined text may state that advisory trading Follower is not participating in this advisory trade because the advisory trading Follower is not fully following advisory trading. The Trade Determination System 210 then transmits the electronic message to an e-mail address associated with the first advisory trading Follower identification.

If the full advisory trading follow indicator indicates that the advisory trading Follower is fully following advisory trading, then the Trade Determination System 210 may retrieve the authorized security type indicator associated with the first advisory trading Follower identification from the Follower Account Database 216.

If the authorized security type indicator indicates that the advisory trading Follower is not authorized to trade type of security associated with the advisory trading share identification, then the Trade Determination System 210 may generate an electronic message for the first advisory trading Follower. For example, when the Trade Determination System 210 determines that the advisory trading authorized security type indicator indicates that the advisory trading Follower is not authorized to trade type of security associated with the advisory trading share identification, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. In one embodiment the predetermined text may state that the advisory trading Follower is not participating in this advisory trade because the advisory Trading Follower is not authorized to trade the type of security being traded. The Trade Determination System 210 may then send the electronic message to an e-mail address associated with the first Follower identification.

If the advisory trading authorized security type indicator indicates that the advisory trading Follower is authorized to trade the type of security associated with the advisory trading share identification, then the Trade Determination System 210 may retrieve a list of deselected individual share identifications associated with the first advisory trading Follower identification in the Follower Account Database 216.

The Trade Determination System 210 may compare the advisory trading share identification to the list of deselected individual share identifications associated with the first advisory trading Follower identification. If the advisory trading share identification matches any of the deselected individual share identifications on the list, then the Trade Determination System 210 may generate an electronic message for the advisory trading Follower. For example, when the Trade Determination System 210 determines that the advisory trading share identification matches any of the deselected individual share identifications on the list, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. In one embodiment the predetermined text may state that advisory trading Follower is not following this advisory trade because the advisory trading share identification was on the list of deselected individual share identifications for the advisory trading Follower. The Trade Determination System 210 may then send the electronic message to an e-mail address associated with the first Follower identification.

If the advisory trading share identification does not match any of the deselected individual share identifications from the list, then the Trade Determination System 210 may determine approved advisory trading Follower share number for the first advisory trading Follower identification.

The Trade Determination System 210 may then retrieve the share calculation method indicator associated with the first advisory trading Follower identification in the Follower Account Database 216.

If the share calculation method indicator associated with the first advisory trading Follower identification indicates that the share calculation method is share-for-share, the Trade Determination System 210 may retrieve the initial advisory trading Follower share number associated with the first advisory trading Follower identification in the Follower Account Database 216.

The Trade Determination System 210 may then multiply the initial advisory trading Follower share number by the advisory trading share price to determine the advisory trading Follower trade total price.

The Trade Determination System 210 may then compare the available advisory trading Follower account balance to the advisory trading Follower trade total price.

If the available advisory trading Follower account balance is less than the advisory trading Follower trade total price, then the Trade Determination System 210 may divide the available advisory trading Follower account balance by the advisory trading share price to determine a reduced advisory trading Follower share number. The Trade Determination System 210 may then set the approved advisory trading Follower share number equal to the reduced advisory trading Follower share number.

If the advisory trading share calculation indicator associated with the first advisory trading Follower identification indicates that the share calculation method is percent-for-percent, then the Trade Determination System 210 may retrieve the advisory trading share percentage associated with the first advisory trading Follower identification in the Follower Account Database 216.

The Trade Determination System 210 may then multiply the available advisory trading Follower account balance by the advisory trading share percentage to determine the advisory trading Follower account trade value.

The Trade Determination System 210 may then divide the advisory trading Follower account trade value by the advisory trading share price to determine the approved advisory trading Follower share number.

If the advisory trading share calculation indicator associated with the first advisory trading Follower identification indicates that the share calculation method is dollar-for-dollar, then the Trade Determination System 210 may retrieve the initial advisory trading trade amount associated with the first advisory trading Follower identification in the Follower Account Database 216.

The Trade Determination System 210 may then compare the available advisory trading Follower account balance associated with the first advisory trading Follower identification to the initial advisory trading trade amount associated with the first advisory trading Follower identification.

If the available advisory trading Follower account balance is less than the initial advisory trading trade amount, then the Trade Determination System 210 may set the approved advisory trading trade amount equal to the available advisory trading Follower account balance.

If the available advisory trading Follower account balance is greater than or equal to the initial advisory trading share amount, then the Trade Determination System 210 may set the approved advisory trading trade amount equal to the initial advisory trading trade amount.

The Trade Determination System 210 may then divide the approved advisory trading trade amount by the advisory trading share price to determine the approved advisory trading Follower share number.

In an embodiment where the advisory trading Follower identification list includes more than one advisory trading Follower identifications, the Trade Determination System 210 may determine the approved advisory trading Follower share number for each advisory trading Follower identification included in the advisory trading Follower identification list.

After the Trade Determination System 210 has determined the approved advisory trading Follower share number (using the share-for-share, percent-for-percent, or dollar-for-dollar calculation method) for each advisory trading Follower identification on the advisory trading Follower identification list, the Trade Determination System 210 may sum the approved advisory trading Follower share number associated with each advisory trading Follower identification from the advisory trading Follower identification list to determine the total advisory trading Follower share number.

The Trade Determination System 210 may then transmit the advisory trading share identification and total advisory trading Follower share number to the Exchange 212 for execution. In one or more embodiments, the Trade Determination System 210 may generate an electronic advisory trading message for each advisory trading Follower identification on the advisory trading Follower identification list, including the advisory trading share identification and the approved advisory trading share number sent to the Exchange 212. For example, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. The Trade Determination System 210 may then send the electronic message to an e-mail address associated with the first advisory trading Follower identification.

The Exchange 212 may transmit an electronic message to the Trade Determination System 210 after the trade has been executed including the total advisory trading Follower share number and the total advisory trading trade price. The Trade Determination System 210 may then receive the electronic message from the Exchange 212 including the total advisory trading Follower share number and the total advisory trading trade price.

After receiving the message from the Exchange 212, the Trade Determination System 210 may then determine the average advisory trading share price. The Trade Determination System 210 determines the average advisory trading traded share price by multiplying the number of advisory trading shares traded by the traded share price for each trade, adding them together, and then dividing by the total number of shares traded.

In another embodiment, the Trade Determination System 210 may determine the average advisory trading share price by dividing the total advisory trading trade price by the total advisory trading Follower share number.

For the first advisory trading Follower identification, the Trade Determination System 210 may access the advisory trading Follower account in the Follower Account Database 216 using the first advisory trading Follower identification and may store the approved advisory trading Follower share number associated with the first advisory trading Follower identification and average advisory trading share price in the Follower Account Database 216.

In another embodiment, a Follower may request to duplicate the portfolio of a selected Lead Trader. In one embodiment, the Follower may select a Lead Trader and may enter a portfolio duplication request indicator into Follower Computer 204. The Follower Computer 204 may transmit the duplication request indicator, duplication Lead Trader identification, and duplication Follower identification to the Lead Trader-Follower Management System 218. The Lead Trader-Follower Management System 218 may receive the duplication request indicator, duplication Lead Trader identification, and duplication Follower identification from the Follower Computer 204. The Lead Trader-Follower Management System may transmit duplication request indicator and duplication Follower identification to the Lead Trader Computer 202 using the duplication Lead Trader identification.

The Lead Trader whose portfolio the Follower has requested approval to duplicate may review the duplication request indicator on the Lead Trader Computer 202. The Lead Trader may then approve or deny the duplication request and may enter a duplication request decision indicator into the Lead Trader Computer 202. The Lead Trader Computer 202 may transmit the duplication request decision indicator to the Lead Trader-Follower Management System 218. If the Lead Trader denies the duplication request, the Lead Trader-Follower Management System 218 may generate an electronic message for the Follower that the request was denied. For example, the Lead Trader-Follower Management System 218 uses the first duplication Follower identification to retrieve an e-mail address associated with the first duplication Follower identification in the Follower Account Database 216. The Trade Determination System 210 then forms an e-mail message by combining predetermined text with the duplication Lead Trader identification. In one embodiment the predetermined text may state that the Lead Trader has denied the Follower's duplication request. The Trade Determination System 210 may then send the electronic message to an e-mail address associated with the first duplication Follower identification.

If the Lead Trader approves the request, the Lead Trader-Follower Management System 218 may generate an electronic message for the Follower that the request was approved and may transmit the electronic message as described above.

In another embodiment, the Lead Trader-Follower Management System 218 may transmit the duplication request decision indicator, duplication Lead Trader identification, and duplication Follower identification to the Dashboard Generation System 208. The Dashboard Generation System 208 may then access the duplication Follower account in the Follower Account Database 216 associated with the duplication Follower identification and associate the duplication request decision indicator and duplication Lead Trader identification with the duplication Follower identification in the Follower Account Database 216.

The Trade Determination System 210 may then access the duplication Lead Trader account in the Lead Trader Account Database 214 using the duplication Lead Trader identification. The Trade Determination System 210 may then retrieve Lead Trader portfolio share identifications and Lead Trader portfolio share numbers from the Lead Trader Account Database 214.

The Trade Determination System 210 may then retrieve a share quote from the Stock Quote System 206 for each Lead Trader portfolio share identification. In another embodiment, the Trade Determination System 210 may transmit the Lead Trader portfolio share identifications to the Dashboard Generation System 208. The Dashboard Generation System 208 may receive the Lead Trader portfolio share identifications. The Dashboard Generation System 208 may then retrieve a share quote from the Stock Quote System 206 for each Lead Trader portfolio share identification. Then the Dashboard Generation System 208 may transmit the Lead Trader portfolio share identifications and share quotes to the Trade Determination System 210.

For each Lead Trader portfolio share identification, the Trade Determination System 210 may multiply the Lead Trader portfolio share number by the share quote to determine the portfolio share cost.

The Trade Determination System 210 may then sum the portfolio share cost for each Lead Trader portfolio share identification to determine the Lead Trader portfolio value.

The Trade Determination System 210 may then retrieve the available duplication Follower account balance associated with the duplication Follower identification from the Follower Account Database 216.

The Trade Determination System 210 may then compare the available duplication Follower account balance to the Lead Trader portfolio value. If the available duplication Follower account balance is less than the Lead Trader portfolio value, the available duplication Follower account balance is not sufficient. If the Trade Determination System 210 determines that the available duplication Follower account balance is not sufficient, the Trade Determination System 210 may generate an electronic message. For example, the Trade Determination System 210 uses the duplication Follower identification to retrieve an e-mail address associated with the duplication Follower identification in the Follower Account Database 216. The Trade Determination System 210 then forms an e-mail message by combining predetermined text with the Lead Trader portfolio share identifications, share quote for each Lead Trader portfolio share identification, portfolio share cost, Lead Trader portfolio share number, and Lead Trader identification. In one embodiment the predetermined text may state that the available duplication Follower account balance was not sufficient to fully duplicate the Lead Trader portfolio. The Trade Determination System 210 may then send the electronic message to an e-mail address associated with the first duplication Follower identification.

If the Trade Determination System 210 determines that the available duplication Follower account balance is greater than or equal to the Lead Trader portfolio value, the Trade Determination System 210 may create a list of Follower portfolio share identifications including the Lead Trader portfolio share identifications. The list may further include the portfolio share number for each Follower portfolio share identification.

The Trade Determination System 210 may then transmit each Follower portfolio share identification and Follower portfolio share number to the Exchange 212 for execution.

After the trade has been executed on the Exchange 212, the Exchange 212 may transmit an electronic message to the Trade Determination System 210 including each Follower portfolio share identification traded, the Follower portfolio share number for each Follower portfolio share identification, and portfolio share price for each Follower portfolio share identification. The Trade Determination System 210 may receive the electronic message from the Exchange 212.

After the Determination System 210 has received the electronic message from the Exchange 212 that the trade has been completed, the Trade Determination System 210 may access the Follower account in the Follower Account Database 216 using the Follower identification and may store each Follower portfolio share identification, the Follower portfolio share number for each Follower portfolio share identification, and portfolio share price for each Follower portfolio share identification.

In one or more embodiments, a Follower may request to stop following a Lead Trader. A Follower may select a Lead Trader identification and may enter a stop following request indicator into the Follower Computer 204. The Follower Computer 204 may transmit the stop following request indicator to the Dashboard Generation System 208 along with the Follower identification and the Lead Follower identification. The Dashboard Generation System 208 may receive the Follower identification, Lead Trader identification, and stop following request indicator from the Follower Computer 204.

The Dashboard Generation System 208 may then access the Follower account in the Follower Account Database 216 using the Follower identification. The Dashboard Generation System 208 may then delete the Lead Trader identification associated with the Follower account that is equal to the Lead Trader identification specified with the stop following request indicator.

The Dashboard Generation System 208 may then access the Lead Trader account the Lead Trader Account Database 214 using the Lead Trader identification. The Dashboard Generation System 208 may then delete the Follower identification associated with the Lead Trader account that is equal to the Follower identification specified with the stop following request indicator.

In another embodiment, a Follower may elect to partially detach shares from a Lead Trader to keep in the Follower account for later trading. The Follower may enter a detach indicator into the Follower Computer 204 for a detached share identification along with a detached share number. The Follower Computer 204 may transmit the detached share identification and detached share number to the Dashboard Generation System 208. The Dashboard Generation System 208 may receive the detached share identification and detached share number from the Follower Computer 204. The Dashboard Generation System 208 may then locate the Follower account in the Follower Account Database 216 using the Follower identification. The Dashboard Generation System 208 may then decrease the number of shares associated with the Follower identification that the Lead Trader can control by the detached share number in the Follower Account Database 216.

Figure 3:
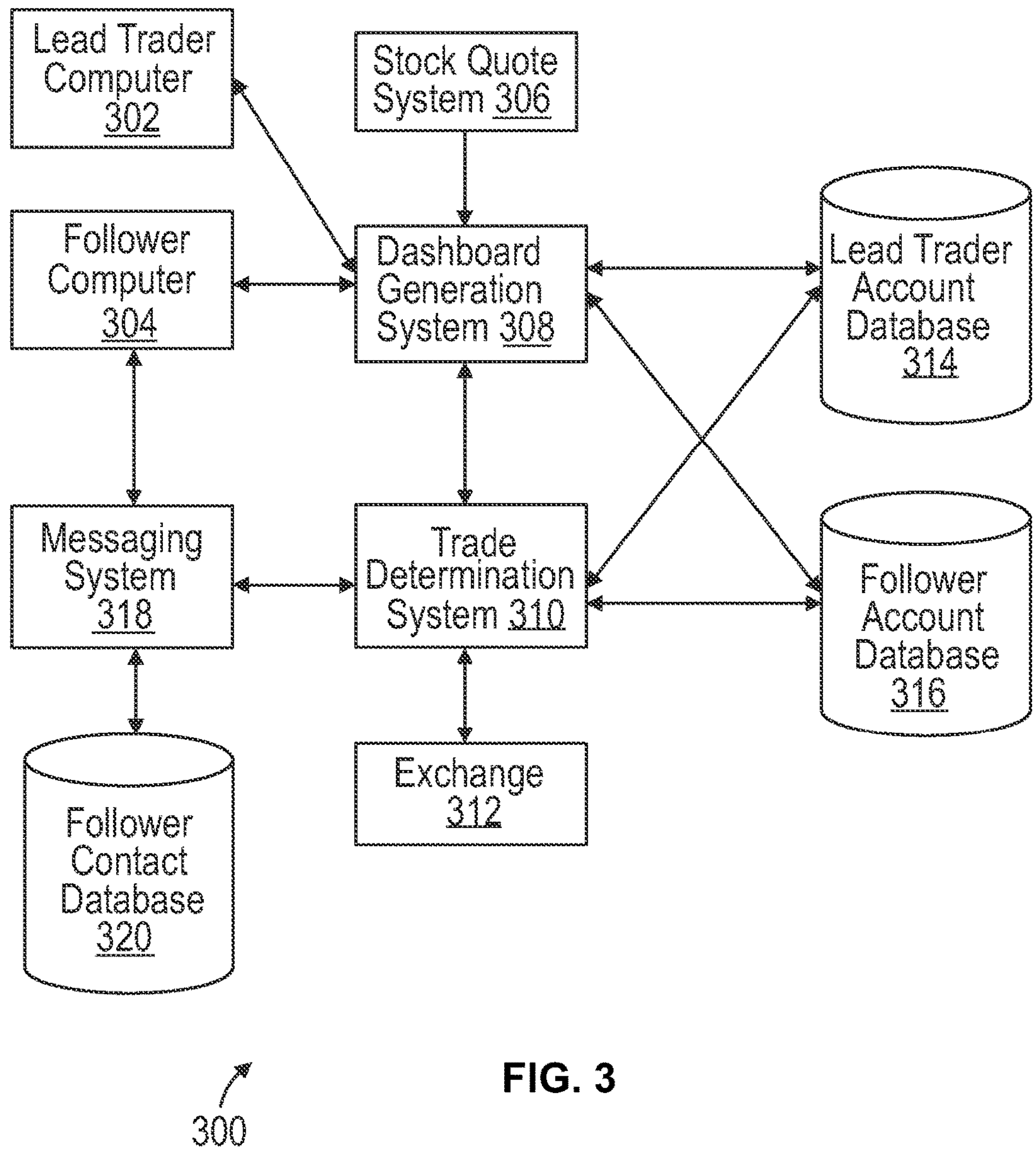
FIG. 3 illustrates an alternative embodiment of a system for automated trade bundling.

FIG. 3 illustrates an alternative embodiment of a system for real-time trade bundling 300. System 300 may include a Lead Trader Computer 302, a Follower Computer 304, a Stock Quote System 306, a Dashboard Generation System 308, a Trade Determination System 310, an Exchange 312, a Lead Trader Account Database 314, a Follower Account Database 316, and a Messaging System 318, and a Follower Contact Database 320.

The Lead Trader Computer 302 may be in communication with the Dashboard Generation System 308. The Follower Computer 304 may be in communication with the Dashboard Generation System 308. The Stock Quote System 306 may be in communication with the Dashboard Generation System 308. The Trade Determination System 310 may be in communication with the Dashboard Generation System 308. The Exchange 312 may be in communication with the Trade Determination System 310. The Lead Trader Account Database 314 may be in communication with the Dashboard Generation System 308. The Follower Account Database 316 may be in communication with the Dashboard Generation System 308. The Lead Trader Account Database 314 may be in communication with the Trade Determination System 310. The Follower Account Database 316 may be in communication with the Trade Determination System 310. The Follower Computer 304 may be in communication with the Messaging System 318. The Messaging System 318 may be in communication with the Follower Contact Database 320. The Messaging System 318 may be in communication with the Trade Determination System 310.

In operation, when the Trade Determination System 310 generates an electronic message, such as for example when a full follow indicator indicates that full following is not set for a Follower identification or when a share identification matches any of the deselected individual share identifications on a list associated with a Follower identification, the Trade Determination System 310 may transmit the electronic message to the Messaging System 318 along with a Follower identification.

The Messaging System 318 may receive the electronic message and Follower identification from the Trade Determination System 310.

After the Messaging System 318 has received the electronic message and Follower identification, the Messaging System 318 may access the Follower account in the Follower Contact Database 320 using the Follower identification. The Messaging System 318 may then retrieve the Follower contact information associated with the Follower identification in the Follower Contact Database 320. In one or more embodiments, the Follower contact information may include a Follower e-mail address.

After the Messaging System 318 has retrieved the Follower contact information associated with the Follower identification from the Follower Contact Database 320, the Messaging System 318 may transmit the electronic message to the Follower Computer 304.

The Follower Computer may receive the electronic message from the Messaging System 318 and may display the electronic message.

Figure 4:
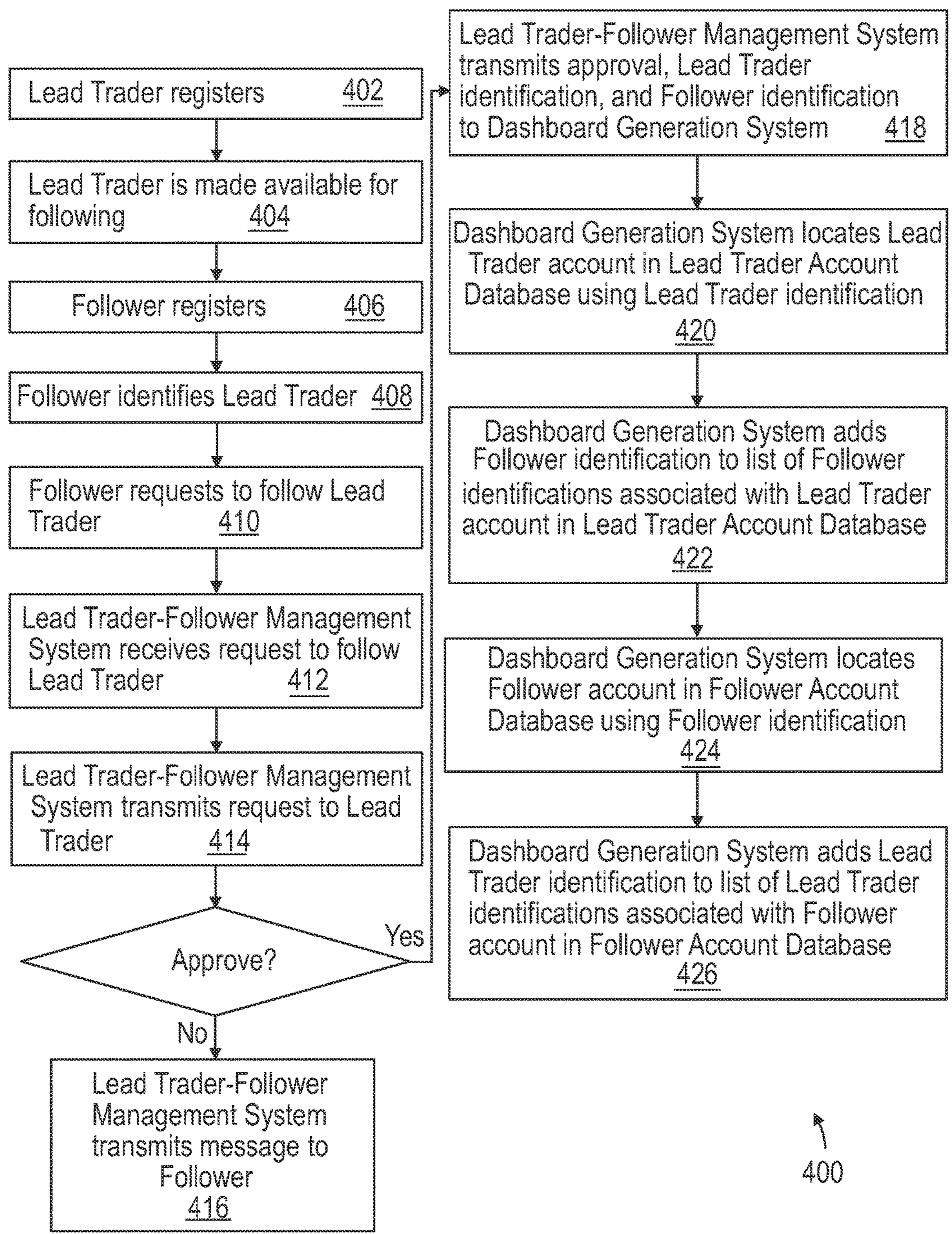
FIG. 4 is a flowchart of a Lead Trader-Follower Attachment Process.

FIG. 4 is a flowchart of a Lead Trader-Follower Attachment Process.

At 402, a Lead Trader registers. In one or more embodiments, the Lead Trader may enter registration information that may be transmitted to a Lead Trader-Follower Management System.

Then, at 404, after a Lead Trader has registered, the Lead Trader may be made available for following. In one or more embodiments, the Lead Trader may be identified in the Lead Trader-Follower Management System.

Then, at 406, a Follower registers. In one or more embodiments, the Follower may enter registration information that may be transmitted to a Lead Trader-Follower Management System.

Next, at 408, a Follower identifies a Lead Trader that the Follower wishes to follow. In one or more embodiments, the Follower may identify the Lead Trader in a Lead Trader-Follower Management System.

Next, at 410, after a Follower has identified a Lead Trader that the Follower wishes to follow, the Follower may request to follow the Lead Trader. In one or more embodiments, the Follower may enter a request into a Follower Computer. The Follower Computer may transmit the request to the Lead Trader-Follower Management System.

At 412, the Lead Trader-Follower Management System receives the Follower request to follow the Lead Trader. In one or more embodiments, the Lead Trader-Follower Management System may receive the request from the Follower Computer.

At 414, the Lead Trader-Follower Management System transmits the request to the Lead Trader. In one or more embodiments, the Lead Trader-Follower Management System may transmit the request to the Lead Trader Computer. The Lead Trader may then view the request on the Lead Trader Computer and may decide to approve or reject the request. In one or more embodiments, the Lead Trader may enter an approval indicator into the Lead Trader Computer.

If the Lead Trader denies the request, then at 416 the Lead Trader-Follower Management System transmits a message to the Follower. In one or more embodiments, the Lead Trader-Follower Management System may transmit an electronic message to the Follower Computer.

If the Lead Trader approves the request, then at 418 the Lead Trader-Follower Management System transmits the approval indicator, Lead Trader identification, and Follower identification to the Dashboard Generation System. The Dashboard Generation System may receive the approval indicator, Lead Trader identification, and Follower identification from the Lead Trader-Follower Management System.

At 420, the Dashboard Generation System locates the Lead Trader account in a Lead Trader Account Database using the Lead Trader identification.

At 422, the Dashboard Generation System adds the Follower identification to the list of Follower identifications associated with the Lead Trader account in the Lead Trader Account Database. The list of Follower identifications associated with the Lead Trader account in the Lead Trader Account Database may represent the Followers who are following the Lead Trader.

At 424, the Dashboard Generation System then locates the Follower account in the Follower Account Database using the Follower identification.

At 426, the Dashboard Generation System then adds the Lead Trader identification to the list of Lead Trader identifications associated with the Follower account in the Follower Account Database. The list of Lead Trader identifications associated with the Follower account in the Follower Account Database may represent the Lead Traders whom the Follower is following.

Figure 5:
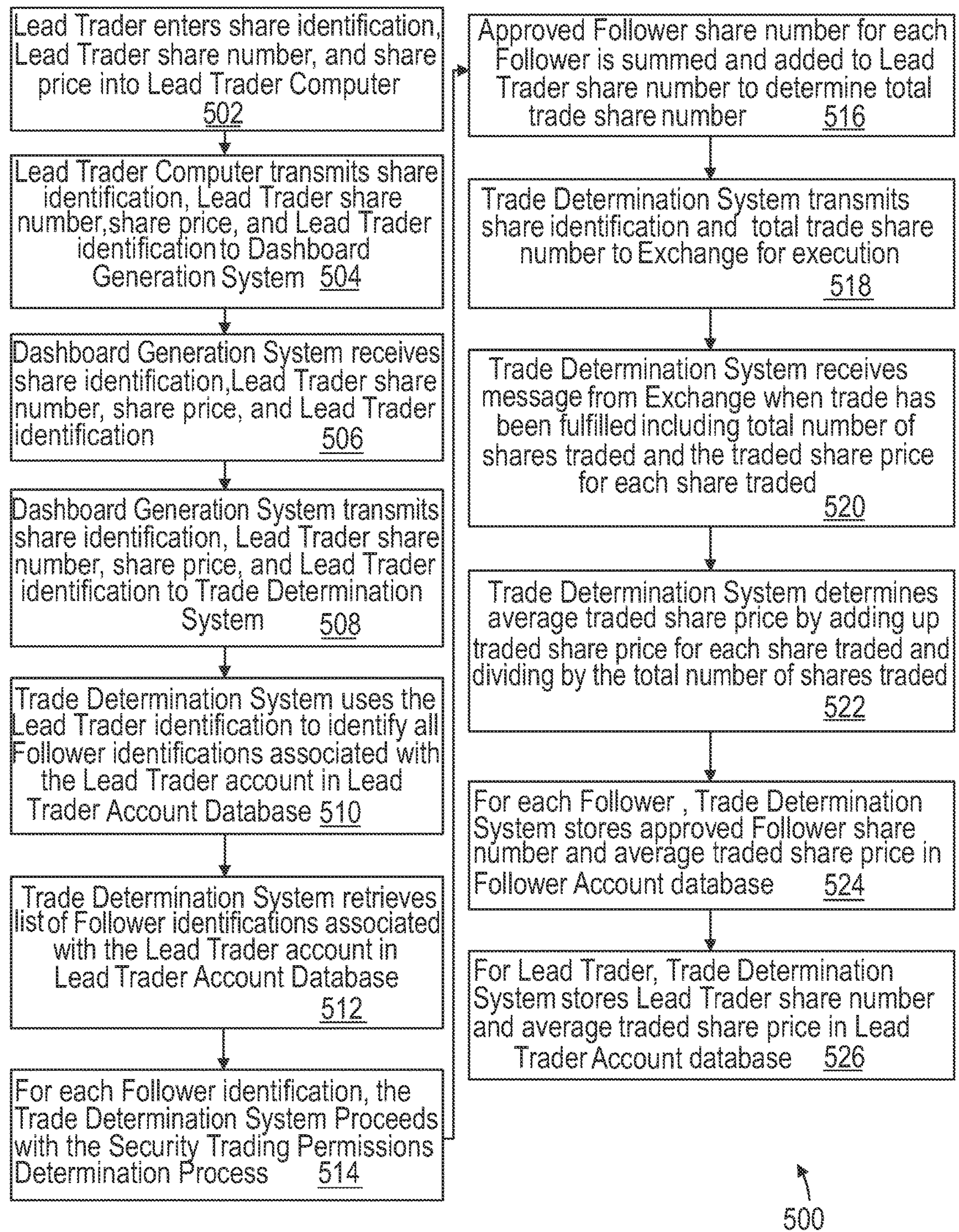
FIG. 5 is a flowchart of an Automated Trade Bundling Process.

FIG. 5 is a flowchart of a Real-Time Trade Bundling Process.

The process may begin at 502, where a Lead Trader enters a share identification, Lead Trader share number, and Lead Trader share price into a Lead Trader Computer. The share identification may identify the security the Lead Trader intends to trade.

At 504, the Lead Trader Computer transmits the share identification, Lead Trader share number, Lead Trader share price, and Lead Trader identification to the Dashboard Generation System.

At 506, the Dashboard Generation System receives the share identification, Lead Trader share number, Lead Trader share price, and Lead Trader identification from the Lead Trader Computer.

At 508, the Dashboard Generation System transmits the share identification, Lead Trader share number, Lead Trader share price, and Lead Trader identification to the Trade Determination System.

At 510, the Trade Determination System uses the Lead Trader identification to identify all Follower identifications associated with the Lead Trader account in the Lead Trader Account Database.

At 512, the Trade Determination System retrieves the list of Follower identifications associated with the Lead Trader account in the Lead Trader Account Database using the Lead Trader identification.

At 514, for each Follower identification on the list retrieved by the Trade Determination System at 512, the Trade Determination System proceeds with the Security Trading Permissions Determination Process (described below and with reference to FIG. 6).

At 516, the Trade Determination System sums the approved Follower share number for each Follower on the list retrieved by the Trade Determination System at 512 along with the Lead Trader share number to determine the total trade share number.

At 518, the Trade Determination System transmits the share identification and total trade share number to the Exchange for execution. After the trade has been executed at the Exchange, the Exchange may transmit an electronic message to the Trade Determination System that may include the total number of shares traded and the traded share price for each share traded.

At 520, the Trade Determination System receives the electronic message from the Exchange including the total number of shares and traded share price for each share traded.

As described above, because not all of the shares may be traded at the same time, and they may have been traded on the Exchange at different prices, at 522, the Trade Determination System determines the average traded share price by adding up the traded share price for each share and then dividing by the total number of shares traded.

At 524, for each Follower, the Trade Determination System stores the approved Follower share number and average traded share price in the Follower Account Database. In one or more embodiments, the Trade Determination System may use each Follower identification to access each Follower account in the Follower Account Database and then store the approved Follower share number and average traded share price for each Follower in the Follower Account Database.

At 526, for the Lead Trader, the Trade Determination System stores the Lead Trader share number and average traded share price in the Lead Trader Account Database. In one or more embodiments, the Trade Determination System may use the Lead Trader identification to access the Lead Trader account in the Lead Trader Account Database and then store the Lead Trader share number and average traded share price for the Lead Trader in the Lead Trader Account Database.

Figure 6:
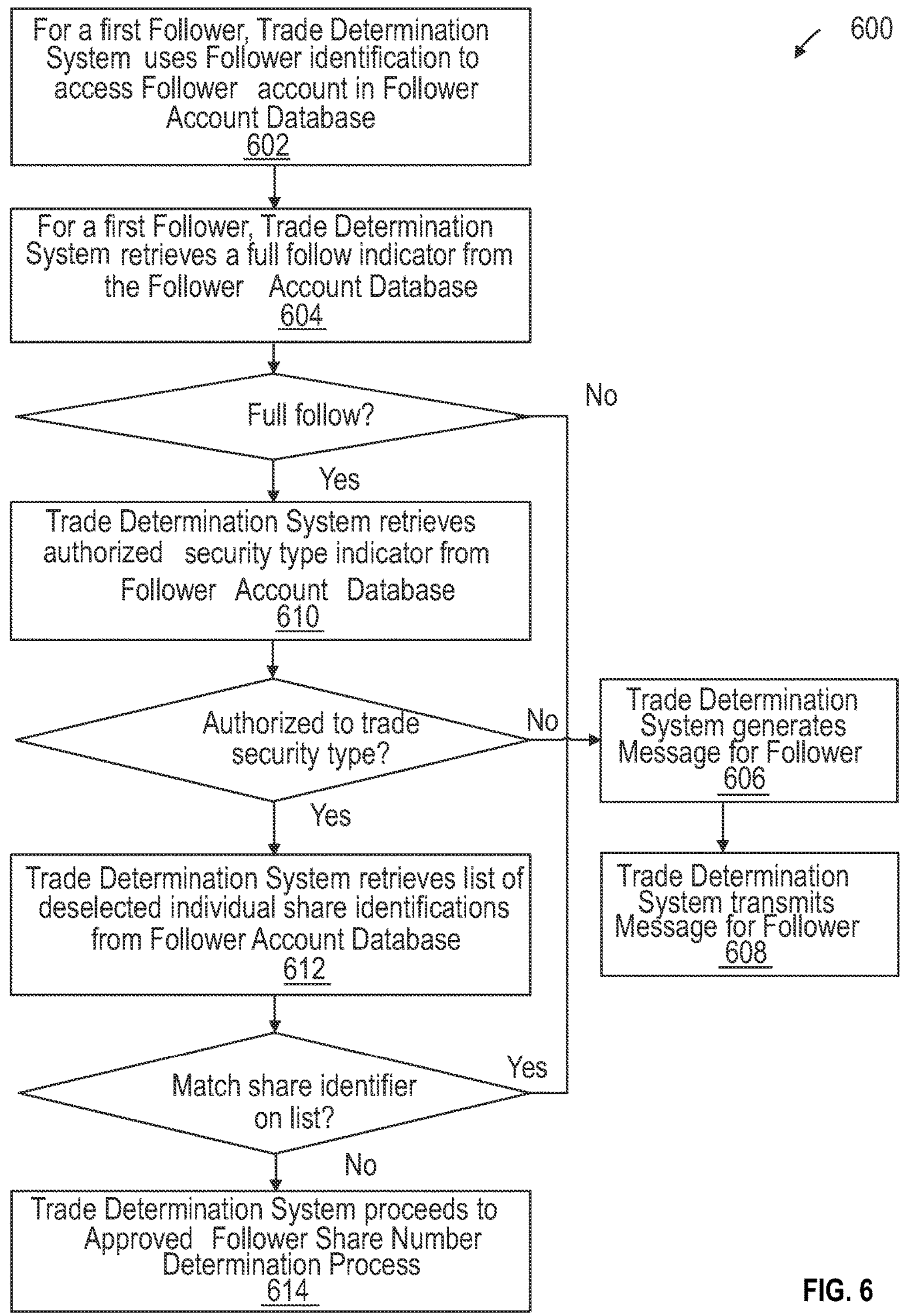
FIG. 6 is a flowchart of a Security Trading Permissions Determination Process.

FIG. 6 is a flowchart of a Security Trading Permissions Determination Process.

The Security Trading Permissions Determination Process may begin at 602 where, for a first Follower, the Trade Determination System accesses the Follower account in the Follower Account Database using the Follower identification.

At 604, for the first Follower, the Trade Determination System retrieves a full follow indicator associated with the Follower account from the Follower Account Database. The Trade Determination System then determines if the full follow indicator indicates whether the Follower is fully following the Lead Trader.

If the full follow indicator indicates that the Follower is not fully following the Lead Trader, at 606, the Trade Determination System generates an electronic message notifying the Follower that the Lead Trader is making a trade and that the Follower is not following that trade.

In one or more embodiments, the Trade Determination System may also add the Follower identification to a list of Non-Following Follower identifications.

At 608, the Trade Determination System transmits the electronic message generated at 606 to the Follower. In one or more embodiments, the electronic message may be transmitted to the Follower Computer.

If the full follow indicator indicates that the Follower is fully following the Lead Trader, at 610, the Trade Determination System retrieves the authorized security type indicator associated with the Follower account in the Follower Account Database. The Trade Determination System then determines if the authorized security type indicator indicates whether the Follower is authorized to participate in a trade involving the security type associated with the share identification.

If the authorized security type indicator indicates that the Follower is not authorized to participate in a trade involving the security type associated with the share identification, then at 606, the Trade Determination System generates an electronic message notifying the Follower that the Lead Trader is making a trade and that the Follower is not following that trade.

At 608, the Trade Determination System transmits the electronic message generated at 606 to the Follower. In one or more embodiments, the electronic message may be transmitted to the Follower Computer.

If the authorized security type indicator that the Follower is authorized to participate in a trade involving the security type associated with the share identification, then at 612 the Trade Determination System retrieves a list of deselected individual share identifications associated with the Follower account in the Follower Account Database. The Trade Determination System then determines if the share identification matches any of the share identifications included in the list of deselected individual share identifications.

If the share identification matches any of the share identifications included in the list of deselected individual share identifications, then at 606, the Trade Determination System generates an electronic message notifying the Follower that the Lead Trader is making a trade and that the Follower is not following that trade.

At 608, the Trade Determination System transmits the electronic message generated at 606 to the Follower. In one or more embodiments, the electronic message may be transmitted to the Follower Computer.

If the share identification does not match any of the share identifications included in the list of deselected individual share identification, then at 614, the Trade Determination System proceeds to the Approved Follower Share Number Determination Process.

Figure 7:
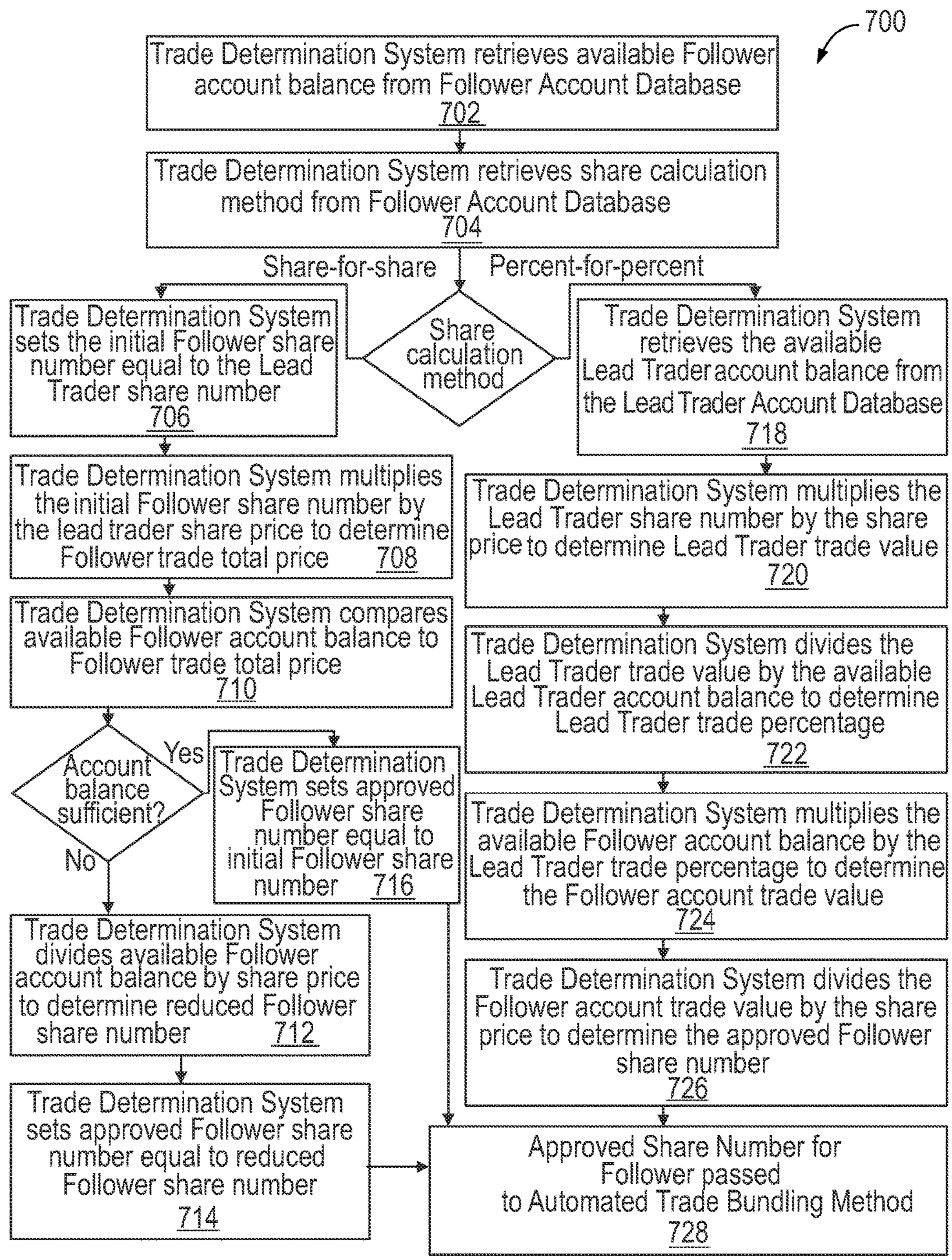
FIG. 7 is a flowchart of an Approved Follower Share Number Determination Process.

FIG. 7 is a flowchart of an Approved Follower Share Number Determination Process.

At 702, the Trade Determination System retrieves the available Follower account balance from the Follower Account database. In one or more embodiments, the Trade Determination System may use the Follower identification to access the Follower account in the Follower Account Database to retrieve the available Follower account balance.

At 704, the Trade Determination System retrieves the share calculation method indicator from the Follower Account Database. In one or more embodiments, the Trade Determination System may use the Follower identification to access the Follower account in the Follower Account Database to retrieve the share calculation method indicator. The Trade Determination System then determines whether the share calculation method indicator indicates share-for-share method or percent-for-percent method.

If the Trade Determination System determines that the share calculation method indicator indicates share-for-share, then at 706, the Trade Determination System sets the initial Follower share number equal to the Lead Trader share number.

Then at 708, the Trade Determination System multiplies the initial Follower share number by the Lead Trader share price to determine Follower trade total price.

At 710, the Trade Determination System compares the available Follower account balance to the Follower trade total price. The Trade Determination System then determines if the available Follower account balance is greater than or equal to the Follower total trade price, or if the available Follower account balance is less than the Follower trade total price.

If the Trade Determination System determines that the available Follower account balance is less than the Follower trade total price, then the available Follower account balance is not sufficient. At 712, the Trade Determination System divides the available Follower account balance by the Lead Trader share price to determine the reduced Follower share number.

Then at 714, the Trade Determination System sets the approved Follower share number equal to the reduced Follower share number.

Then, at 728, the approved Follower share number is passed to the Real-Time Trade Bundling Method (described above and with reference to FIG. 5).

If the Trade Determination System determines that the share calculation method indicator indicates share-for-share, then at 718, the Trade Determination System retrieves the available Lead Trader account balance from the Lead Trader Account Database. In one or more embodiments, the Trade Determination System may use the Lead Trader identification access the Lead Trader account in the Lead Trader Account Database and retrieve the available Lead Trader account balance.

At 720, the Trade Determination System multiplies the Lead Trader share number by the Lead Trader share price to determine the Lead Trader trade value.

At 722, the Trade Determination System divides the Lead Trader trade value by the available Lead Trader account balance to determine the Lead Trader trade percentage.

At 724, the Trade Determination System multiplies the available Follower account balance for the Follower by the Lead Trader trade percentage to determine the Follower account trade value.

At 726, the Trade Determination System divides the Follower account trade value by the Lead Trader share price to determine the approved Follower share number.

Then at 728, the approved Follower share number is passed to the Real-Time Trade Bundling Process (described above and with reference to FIG. 5).

Figure 8:
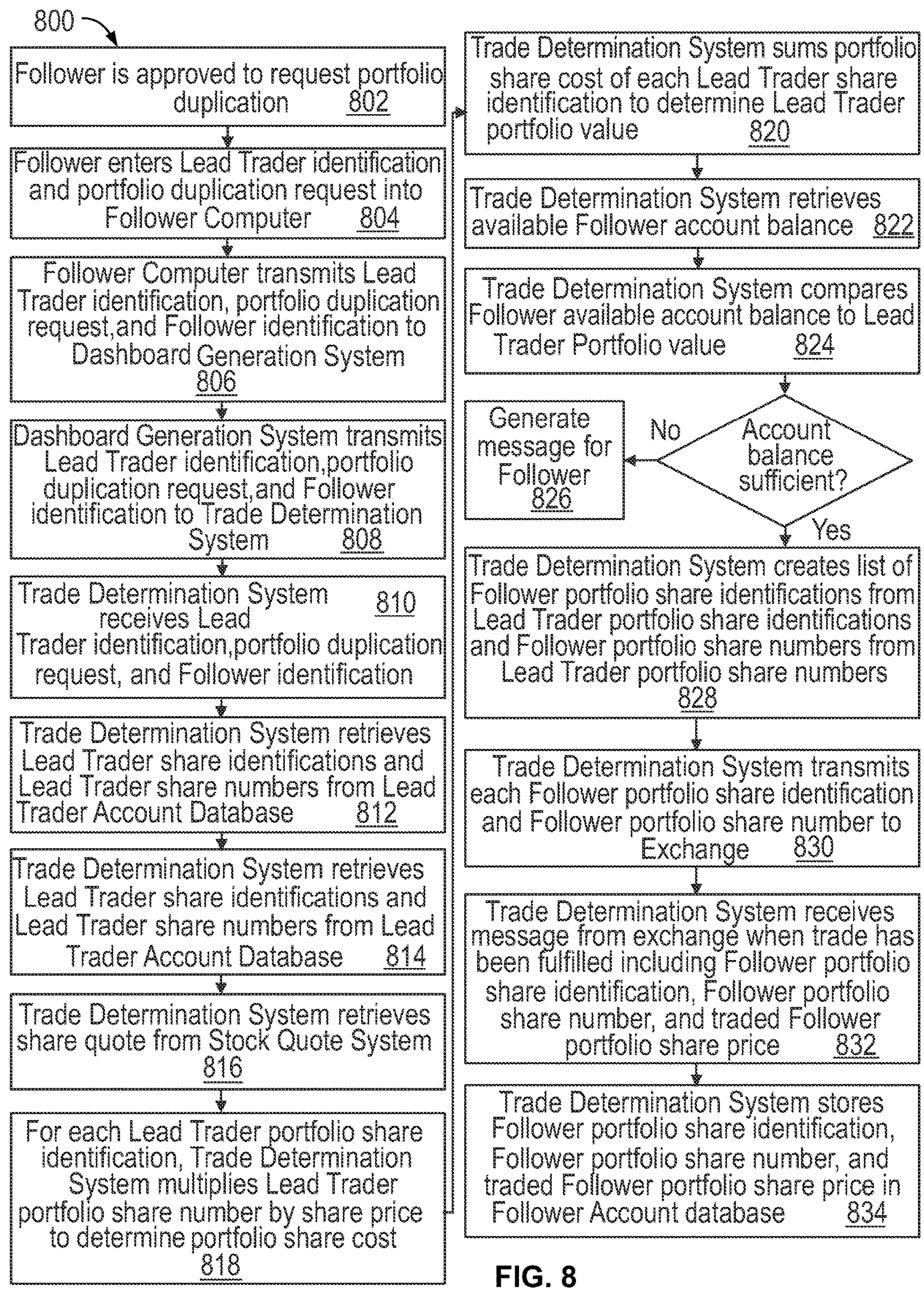
FIG. 8 is a flowchart of a Portfolio Duplication Process.

In one or more embodiments, a Follower may choose to duplicate the portfolio of a Lead Trader. FIG. 8 is a flowchart of a Portfolio Duplication Process.

At 802, a Follower is approved to request portfolio duplication.

At 804, the Follower enters a Lead Trader identification and portfolio duplication request into the Follower Computer.

At 806, the Follower Computer transmits the Lead Trader identification, portfolio duplication request, and Follower identification to the Dashboard Generation System.

At 808, the Dashboard Generation System transmits the Lead Trader identification, portfolio duplication request, and Follower identification to the Trade Determination System.

At 810, the Trade Determination System receives the Lead Trader identification, portfolio duplication request, and Follower identification.

At 812, the Trade Determination System accesses the Lead Trader account in the Lead Trader Account Database using the Lead Trader identification.

At 814, the Trade Determination System retrieves the Lead Trader portfolio share identifications and Lead Trader portfolio share numbers for the Lead Trader's portfolio from the Lead Trader Account Database.

At 816, the Trade Determination System retrieves a portfolio share price from the Stock Quote System for each Lead Trader portfolio share identification. In an alternative embodiment, the Trade Determination System may transmit a request to the Dashboard Generation System to retrieve the portfolio share price from the Stock Quote System. The request may include the Lead Trader portfolio share identifications. The Dashboard Generation System may receive the request including the Lead Trader portfolio share identifications. The Dashboard Generation System may then retrieve the portfolio share price for each Lead Trader portfolio share identification from the Stock Quote System using the Lead Trader portfolio share identifications. The Dashboard Generation System may then transmit the Lead Trader portfolio share identifications and portfolio share prices to the Trade Determination System.

At 818, for each Lead Trader portfolio share identification, the Trade Determination System multiplies the Lead Trader portfolio share number by the portfolio share price to determine the portfolio share cost.

At 820, the Trade Determination System sums the portfolio share cost of each Lead Trader portfolio share identification to determine the Lead Trader portfolio value.

At 822, the Trade Determination System retrieves the available Follower account balance. The Trade Determination System may retrieve the available Follower account balance from the Follower Account Database using the Follower identification.

At 824, the Trade Determination System compares the available Follower account balance to Lead Trader portfolio value.

If the available Follower account balance is less than the Lead Trader portfolio value, then the available Follower account balance is not sufficient for this trade, and at 826 the Trade Determination System generates an electronic message for the Follower. The electronic message may be sent to the Follower Computer.

If the available Follower account balance is greater than or equal to the Lead Trader portfolio value, then the available Follower account balance is sufficient for this trade, and at 828, the Trade Determination System may create a list of Follower portfolio share identifications including the Lead Trader portfolio share identifications. The list may further include a Follower portfolio share number for each Follower portfolio share identification equal to the Lead Trader portfolio share number for the corresponding Lead Trader portfolio share identification.

At 830, the Trade Determination System may then transmit each Follower portfolio share identification and Follower portfolio share number to the Exchange for trade execution. After the trade has been executed on the Exchange, the Exchange may transmit an electronic message to the Trade Determination System including each Follower portfolio share identification traded, the Follower portfolio share number for each Follower portfolio share identification, and traded Follower portfolio share price for each Follower portfolio share identification.

Then at 832, the Trade Determination System receives the electronic message from the Exchange including each Follower portfolio share identification traded, the Follower portfolio share number for each Follower portfolio share identification, and traded Follower portfolio share price for each Follower portfolio share identification.

At 834, after the Trade Determination System has received the electronic message from the Exchange, the Trade Determination System may access the Follower account in the Follower Account Database using the Follower identification and may store each Follower portfolio share identification, the Follower portfolio share number for each Follower portfolio share identification, and traded Follower portfolio share price for each Follower portfolio share identification.

Figure 9:
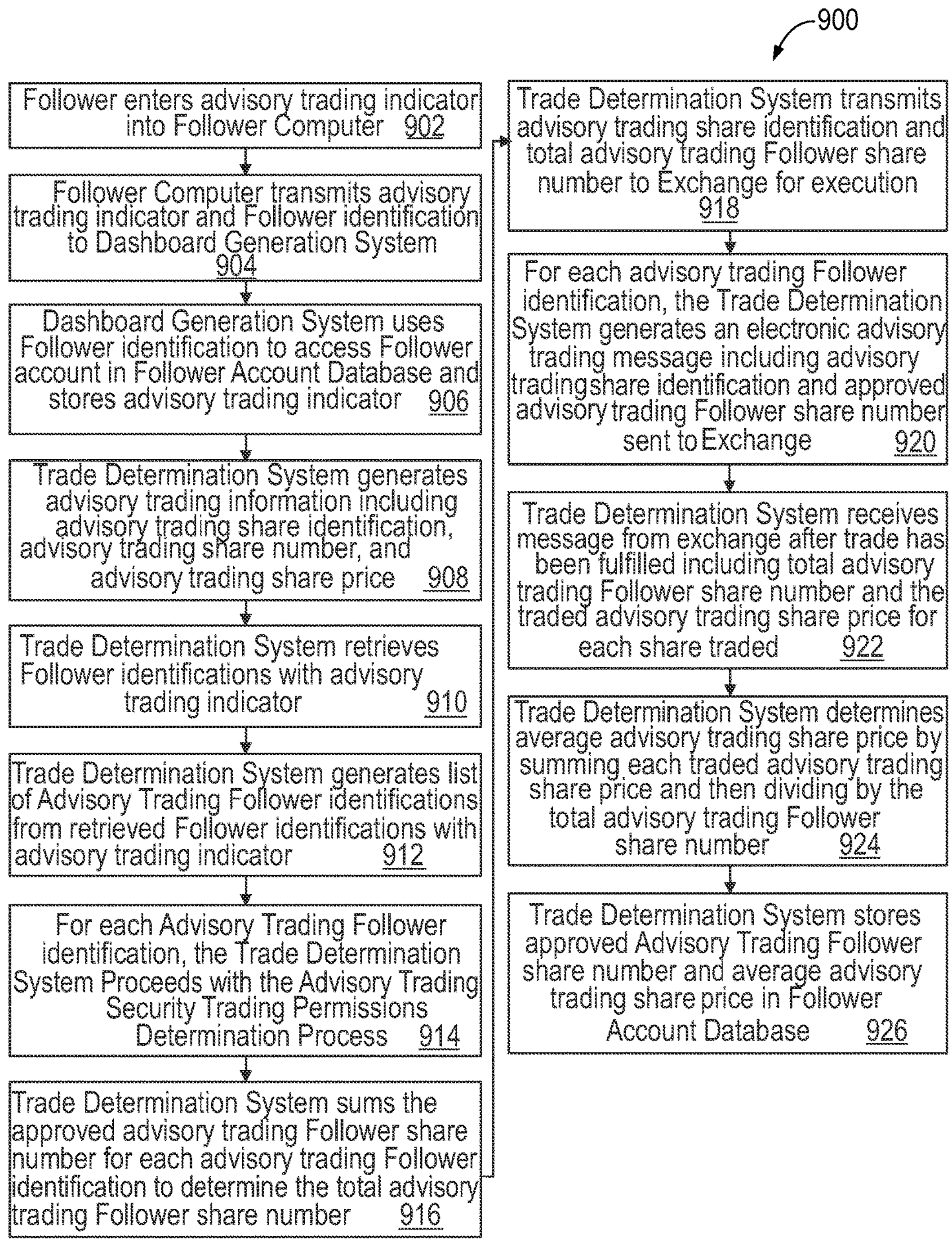
FIG. 9 is a flowchart of an Advisory Trading Process.

FIG. 9 is a flowchart of an Advisory Trading Process.

At 902, the Follower enters an advisory trading indicator into the Follower Computer.

At 904, the Follower Computer transmits the advisory trading indicator and Follower identification to the Dashboard Generation System. The Dashboard Generation System may receive the advisory trading indicator and Follower identification from the Follower Computer.

At 906, the Dashboard Generation System accesses the Follower account in the Follower Account Database using the Follower identification and stores the advisory trading indicator.

Then, at 908, the Trade Determination System generates advisory trading information including advisory trading share identification, advisory trading share number, and advisory trading share price.

At 910, the Trade Determination System accesses the Follower Account Database and retrieves Follower identifications with an advisory trading indicator.

Then at 912, the Trade Determination System generates a list of advisory trading Follower identifications from Follower identifications retrieved at 910.

At 914, for each advisory trading Follower identification, the Trade Determination System proceeds with the Advisory Trading Security Trading Permissions Determination Process (described below and with reference to FIG. 10).

At 916, the Trade Determination System sums the approved advisory trading Follower share number for each advisory trading Follower identification to determine the total advisory trading Follower share number.

At 918, the Trade Determination System transmits the advisory trading share identification and total advisory trading Follower share number to the Exchange for execution.

At 920, the Trade Determination System generates an electronic advisory trading message for each advisory trading Follower identification including the advisory trading share identification and the approved advisory trading Follower share number sent to the Exchange. After the trade is executed on the Exchange, the Exchange transmits an electronic message to the Trade Determination System including the total number of advisory trading shares traded and the traded advisory trading share price for each share traded.

After the trade has been executed at the Exchange, at 922, the Trade Determination System receives the electronic message from the Exchange including the total advisory trading Follower share number and the traded advisory trading share price for each share traded. In an alternative embodiment, the Trade Determination System may compare the total number of advisory trading shares traded to the total advisory trading Follower share number to determine if they match.

Then at 924, the Trade Determination System determines the average advisory trading share price by summing each traded advisory trading share price and then dividing by the total advisory trading Follower share number.

At 926, for each advisory trading Follower identification, the Trade Determination System stores the approved advisory trading Follower share number and average advisory trading share price in the Follower Account Database.

Figure 10:
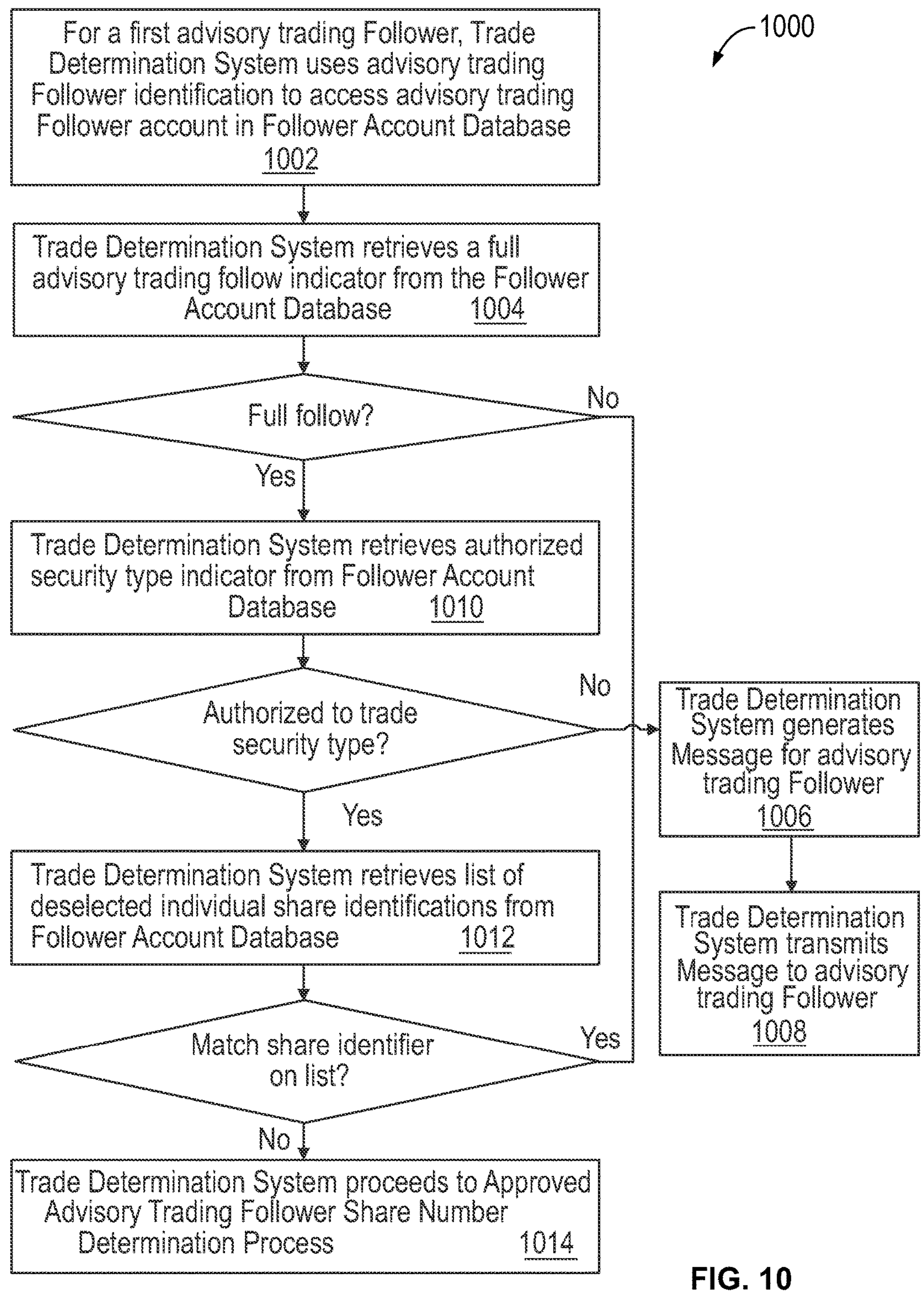
FIG. 10 is a flowchart of an Advisory Trading Security Trading Permissions Determination Process.

FIG. 10 is a flowchart of an Advisory Trading Security Trading Permissions Determination Process.

At 1002, for a first advisory trading Follower identification, the Trade Determination System accesses advisory trading Follower account in the Follower Account Database using the advisory trading Follower identification.

At 1004, the Trade Determination System retrieves a full advisory trading follow indicator from the Follower Account Database.

If the full advisory trading follow indicator indicates that the advisory trading Follower is not fully following advisory trading, then at 1006 the Trade Determination System generates an electronic message for the advisory trading Follower.

Then at 1008, the Trade Determination System transmits the electronic message to the advisory trading Follower. In an alternative embodiment the electronic message may be transmitted to the advisory trading Follower Computer.

If the full advisory trading follow indicator indicates that the advisory trading Follower is fully following advisory trading, then at 1010 the Trade Determination System retrieves the authorized security type indicator from the Follower Account Database associated with the Follower account.

If the authorized security type indicator indicates that the Follower is not authorized to participate in a trade involving the security type associated with the share identification, then at 1006 the Trade Determination System generates an electronic message for the advisory trading Follower.

Then at 1008, the Trade Determination System transmits the electronic message to the advisory trading Follower. In an alternative embodiment the electronic message may be transmitted to the advisory trading Follower Computer.

If the authorized security type indicator that the Follower is authorized to participate in a trade involving the security type associated with the share identification, then at 1012 the Trade Determination System retrieves a list of deselected individual share identifications associated with the Follower account from the Follower Account Database.

If the share identification matches any of the share identifications included in the list of deselected individual share identifications, then at 1006, the Trade Determination System generates an electronic message notifying the Follower that the Lead Trader is making a trade and that the Follower is not following that trade.

At 1008, the Trade Determination System transmits the electronic message generated at 1006 to the Follower. In one or more embodiments, the electronic message may be transmitted to the Follower Computer.

If the share identification does not match any of the share identifications included in the list of deselected individual share identification, then at 1014, the Trade Determination System proceeds to the Approved Follower Share Number Determination Process.

Figure 11:
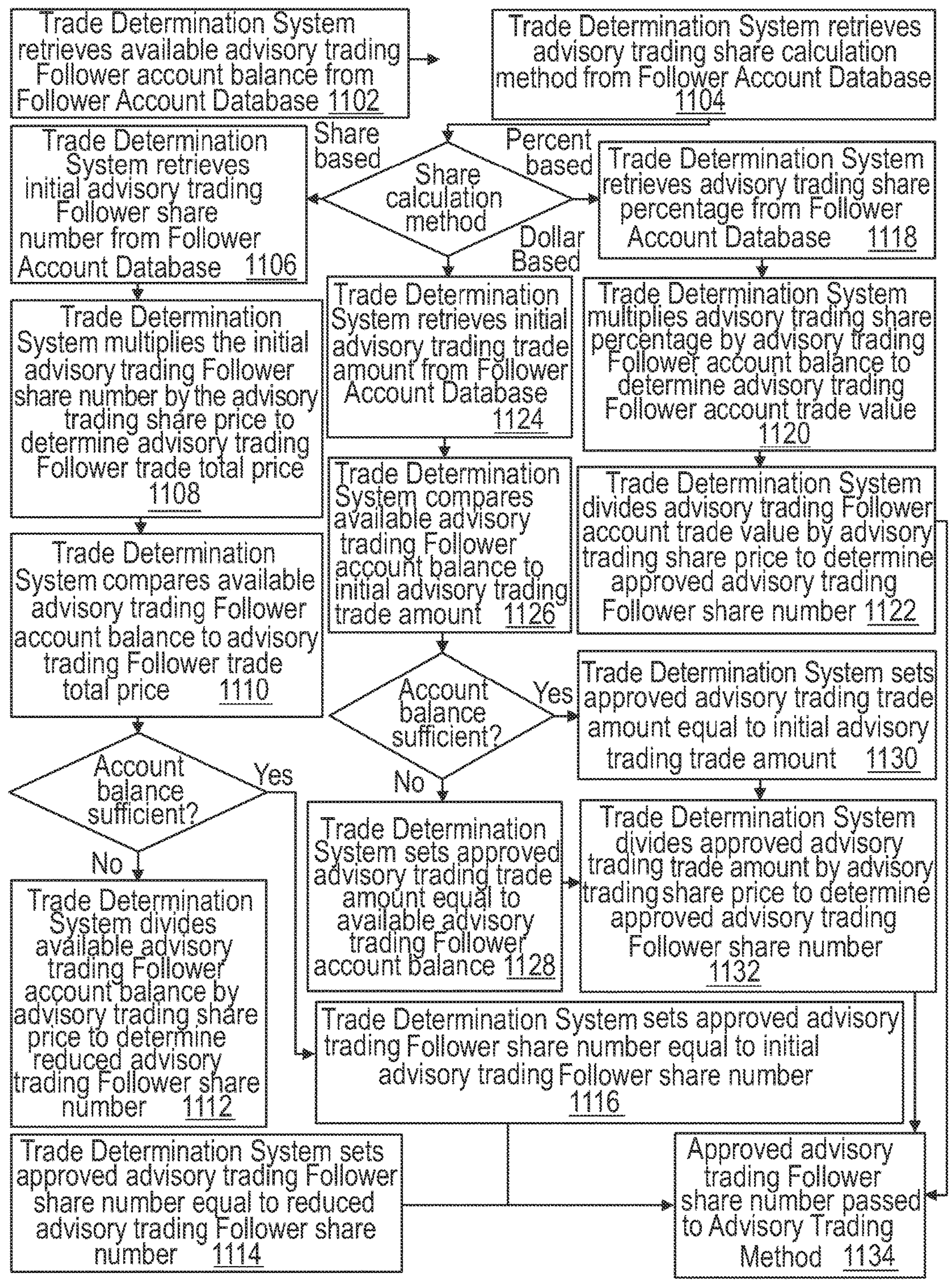
FIG. 11 is a flowchart of an Approved Advisory Trading Follower Share Number Determination Process.

FIG. 11 is a flowchart of an Approved Advisory Trading Follower Share Number Determination Process At 1102, the Trade Determination System retrieves the available advisory trading Follower account balance from the Follower Account Database.

At 1104, the Trade Determination System retrieves the advisory trading share calculation method from the Follower Account Database.

If the advisory trading share calculation method is share based, then at 1106 the Trade Determination System retrieves the initial advisory trading Follower share number from the Follower Account Database.

At 1108, the Trade Determination System multiplies the initial advisory trading Follower share number by the advisory trading share price to determine the advisory trading Follower trade total price.

At 1110, the Trade Determination System compares the available advisory trading Follower account balance to the advisory trading Follower trade total price.

If the available advisory trading Follower account balance is less than the advisory trading Follower trade total price, then the available advisory trading Follower account balance is insufficient for this trade, and at 1112, the Trade Determination System divides the available advisory trading Follower account balance by the advisory trading share price to determine the reduced advisory trading Follower share number.

At 1114, the Trade Determination System sets the approved advisory trading Follower share number equal to the reduced advisory trading Follower share number.

Then, at 1134, the approved advisory trading Follower share number is passed to the Advisory Trading Method.

If the advisory trading share calculation method is percent based, then at 1118, the Trade Determination System retrieves the advisory trading share percentage from the Follower Account Database.

At 1120, the Trade Determination System multiplies the available advisory trading Follower account balance by the advisory trading share percentage to determine the advisory trading Follower account trade value.

At 1122, the Trade Determination System divides the advisory trading Follower account trade value by the advisory trading share price to determine the approved advisory trading Follower share number.

Then, at 1134, the approved advisory trading Follower share number is passed to the Advisory Trading Method.

If the share calculation method is dollar based, then at 1124 Trade Determination System retrieves the initial advisory trading trade amount from the Follower Account Database.

At 1126, the Trade Determination System compares the available advisory trading Follower account balance to the initial advisory trading trade amount.

If the available advisory trading Follower account balance is less than the initial advisory trading trade amount, then at 1128, then the available advisory trading Follower account balance is not sufficient for this trade, and the Trade Determination System sets the approved advisory trading trade amount equal to the available advisory trading Follower account balance.

If the available advisory trading Follower account balance is greater than or equal to the initial advisory trading share amount, then the available advisory trading Follower account balance is sufficient for this trade, and at 1130, the Trade Determination System sets the approved advisory trading trade amount equal to the initial advisory trading trade amount.

At 1132, the Trade Determination System divides the approved advisory trading trade amount by the advisory trading share price to determine the approved advisory trading Follower share number.

Then at 1134 the approved advisory trading Follower share number is passed to the Advisory Trading Method.

FIG. 12 is an embodiment of a Lead Trader Dashboard 1200. The Lead Trader Dashboard 1200 may include a Buying Power section 1202, a Trade Entry section 1204, an Open Orders section 1206, a Current Positions section 1208, a Daily Gain/Loss section 1210, a Markets section 1212, and a Daily Transactions section 1214.

Buying Power section 1202 includes Cash, Margin, Day Trading, Current Account Value, and Start of Day Account Value information.

Trade Entry Section 1204 includes Share Symbol, Last Price, Price Change, Bid, Ask, Share Number, Order, Price Type, Entry, Stop, Target, Submit and Cancel information. The Trade Entry Section 1204 may be used, for example, by a Lead Trader to enter a trade that may then be passed to the Dashboard Generation System 108 and trade determination system 110 as described above.

Open Orders section 1206 includes Share Symbol, Share Quantity, Last Price, Price Change, Bid, Ask, Entry, Stop, Stop Limit, Target, Update, Loss/Gain, and Close Market information.

Current Positions section 1208 includes Tim, Share Symbol, Share Quantity, Share Quantity Filled, Type, Price, Average Price, Amount, Status, and TIF information.

Daily Gain/Loss section 1210 includes Unrealized Gain/Loss, Realized Gain/Loss, and Total Gain/Loss information.

Markets section 1212 includes market information such as the Dow Jones, S&P 500, and NASDAQ market information.

Figure 13:
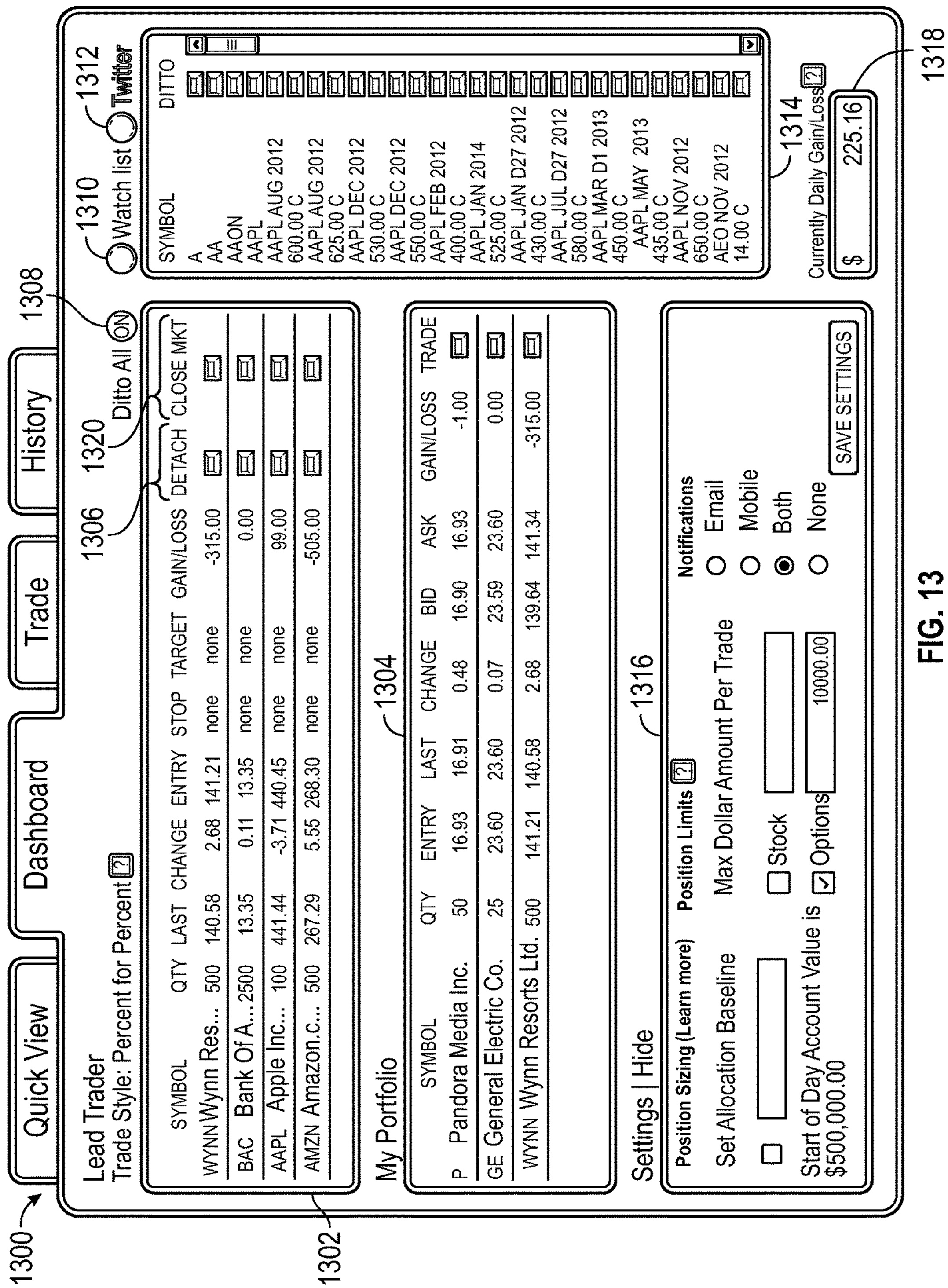
FIG. 13 is an embodiment of a Follower Dashboard.

FIG. 13 is an embodiment of a Follower Dashboard 1300. The Follower Dashboard 1300 includes a Lead Trader section 1302, a My Portfolio section 1304, a Ditto All button 1308, a Watch List button 1310, a Twitter button 1312, a Message section 1314, a Settings section 1316, and a Current Daily Gain/Loss section 1318.

The Lead Trader section 1302 includes Trade Style, Share Symbol, Share Quantity, Last Price, Price Change, Entry, Stop, and Target information, as well as a Detach button 1306 and a Close Market button 1320 for each security listed in the Lead Trader section 1302.

When the Detach button 1306 is pressed, the position is detached from automatic trading/full following. For example, although a certain position may have been opened (such as when shares are purchased), the follower may no longer want the position to be exposed to automatic trading. For example, although 500 shares of WYNN may have been purchased due to the follower following a certain Lead Trader, if the 500 shares of WYNN are detached, the 500 shares of WYNN will not be sold even if the lead trader sells the shares.

When the Close Market button 1320 is pressed, the associated position is sold.

The My Portfolio section 1304 includes Share Symbol, Share Quantity, Entry, Last Price, Price Change, Bid, Ask, and Gain/Loss information as well as a Trade button. When the Trade button is pressed, a trade window appears to allow the follower to initiate a trade as shown below.

The Ditto All button 1308 may allow the Follower to select full following for a selected Lead Trader.

The Watch List button 1312 may bring up a listing of all available securities to allow a Follower to select certain shares to be allowed or not allowed to be traded as part of an automatic trade initiated by a Lead Trader. The individual securities may be selected by clicking on the box to the right of the individual security.

Alternatively, the Watch List button 1310 may allow the Follower to view Watch List Messages in the Message section 1314. The Twitter Button 1312 may allow the Follower to view a Twitter feed in the Message section 1314.

The Settings section 1316 includes Portfolio Sizing, Position Limits, and Notifications. Portfolio Sizing includes Set Allocation Baseline information and Start of Day Account value information.

Position Limits includes Max Dollar Amount Per Trade for Stocks and Options. This allows the follower to set the maximum dollar amount for an acceptable automatic trade. Trades at a higher dollar amount may not be automatically performed.

Notifications includes selection of Email, Mobile, Both, or None. Notifications may be sent to the follower, for example, when a trade is automatically performed and/or when a trade is not automatically performed.

Figure 14:
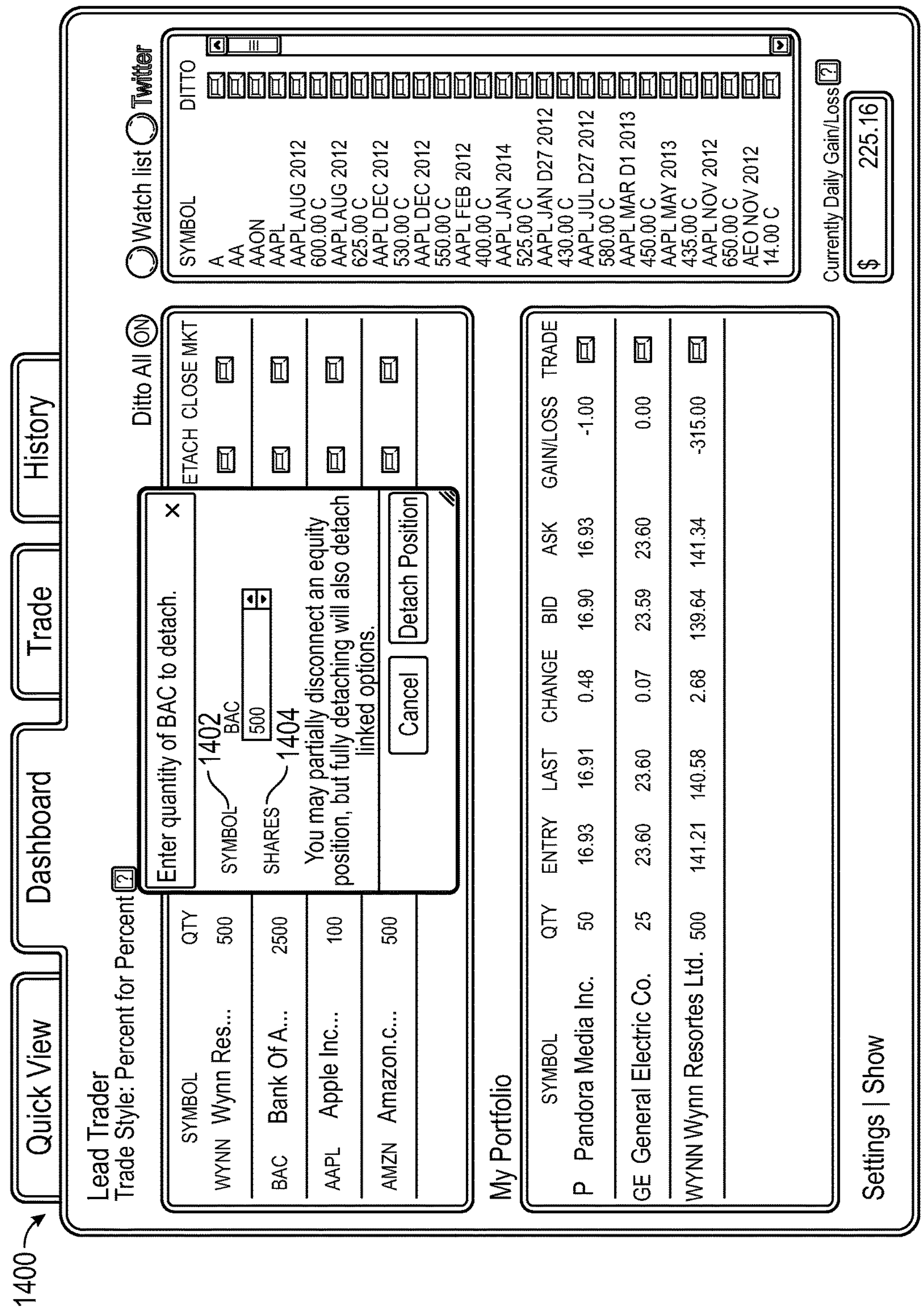
FIG. 14 is an embodiment of a Detachment Pop-Up Window.

FIG. 14 is an embodiment of a Detachment Pop-Up Window 1400. The Detachment Pop-Up Window includes a Share Symbol section 1402 and a Share Number section 1404. The Detachment Pop-Up Window 1400 may display on the Follower Dashboard after a Follower clicks the Detach button.

Figure 15:
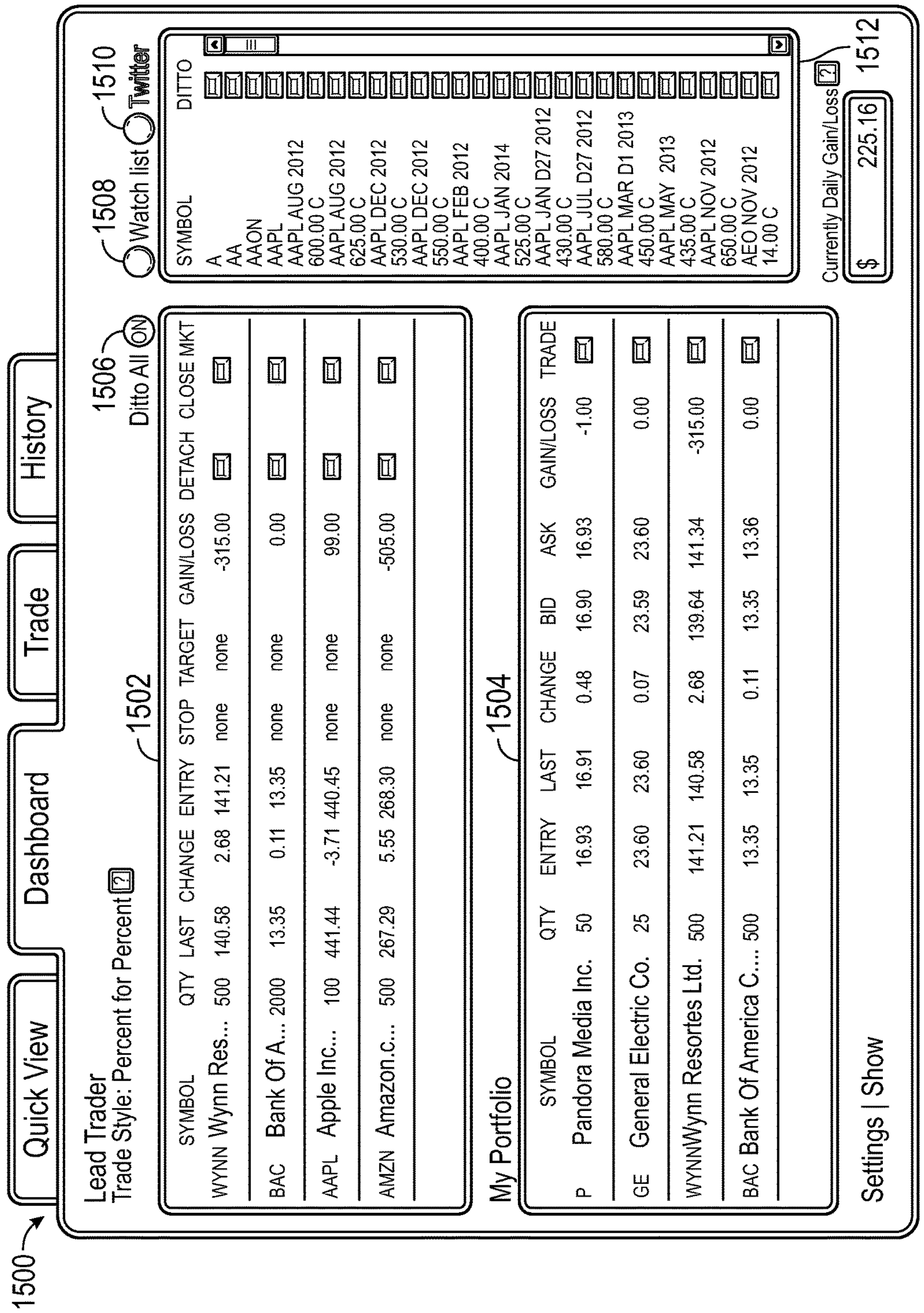
FIG. 15 is an alternative embodiment of a Follower Dashboard.

FIG. 15 is an alternative embodiment of a Follower Dashboard 1500. Follower Dashboard 1500 includes a Lead Trader section 1502, a My Portfolio section 1504, a Ditto All button 1506, a Watch List button 1508, a Twitter button 1510, and a Message Section 1512. The Follower Dashboard 1500 is generally similar to the Follower Dashboard 1300 of FIG. 13, but does not show the settings.

The Lead Trader section 1502 includes a Share Symbol, Share Quantity, Last Price, Price Change, Entry, Stop, Target, and Gain/Loss information as well as a Detach button and a Close Market button.

The My Portfolio section 1504 includes a Share Symbol, Share Quantity, Entry, Last Price, Price Change, Bid, Ask, and Gain/Loss information as well as a Trade button.

The Watch List button 1508 allows the Follower to view watch list information in the Message section 1512. The Twitter button 1510 allows the Follower to view a Twitter feed in the Message section 1512.

Figure 16:
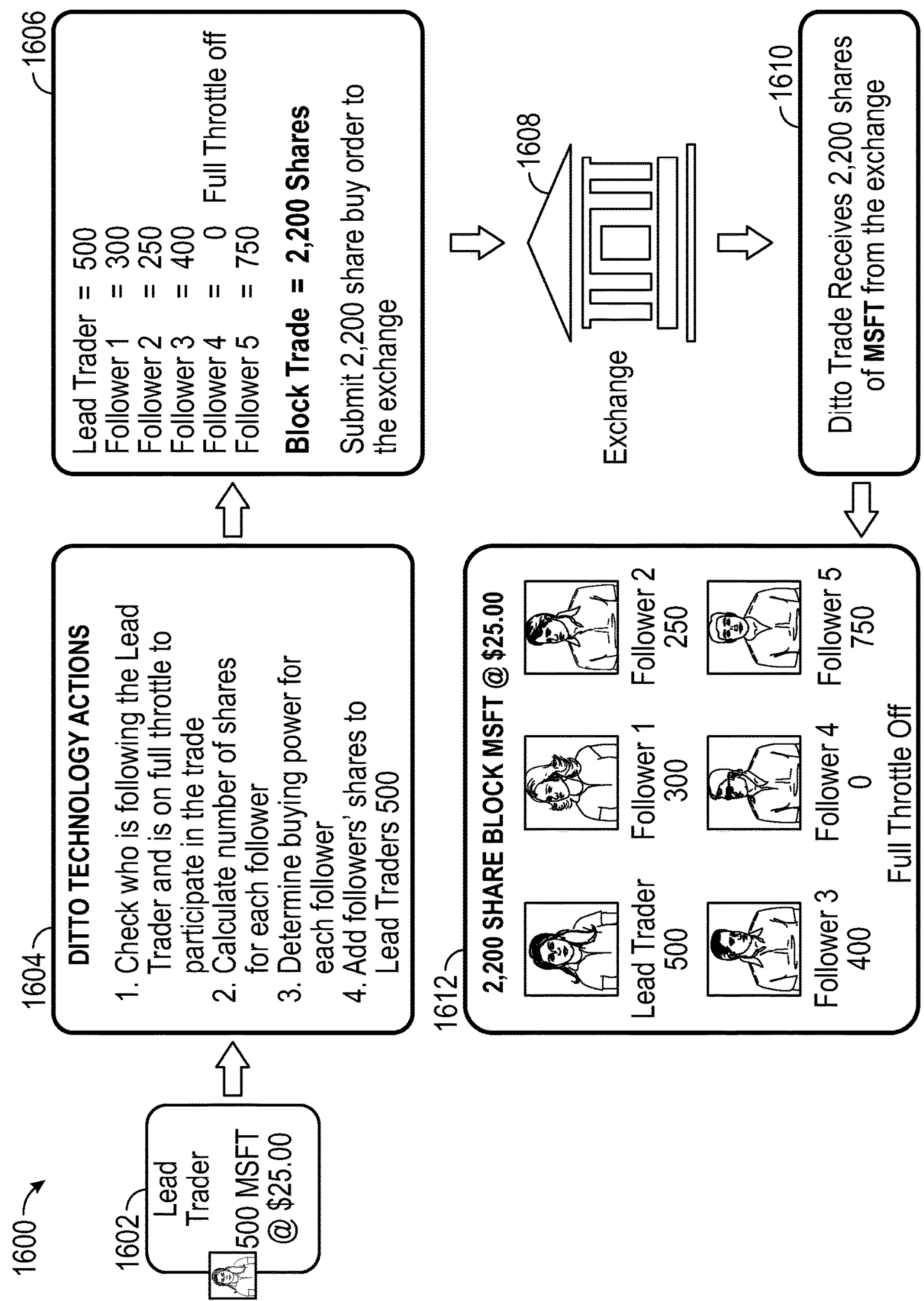
FIG. 16 is a flowchart for a method for automated trade bundling.

FIG. 16 is a flow diagram for a method for automated trade bundling 1600.

At 1602, a Lead Trader enters a share identification and a Lead Trader share number.

At 1604, the System first checks who is following the Lead Trader and is on full throttle to participate in the trade, then calculates the number of shares for each Follower, then determines the buying power for each Follower, and then adds the Follower's shares to the Lead Trader share number.

At 1606, the System then determines the total number of shares in the block trade by adding Lead Trader share number to the number of shares for each follower.

At 1608, the System then submits the block trade to an Exchange for execution.

At 1610, the System receives a message from the Exchange including the total number of shares in the block trade and the share identification and the trade price for each share or each block of shares.

At 1612, the System then allocates to the Lead Trader and to each Follower the number of shares from the total number of in the block trade and the average share price for the block trade.

Figure 17:
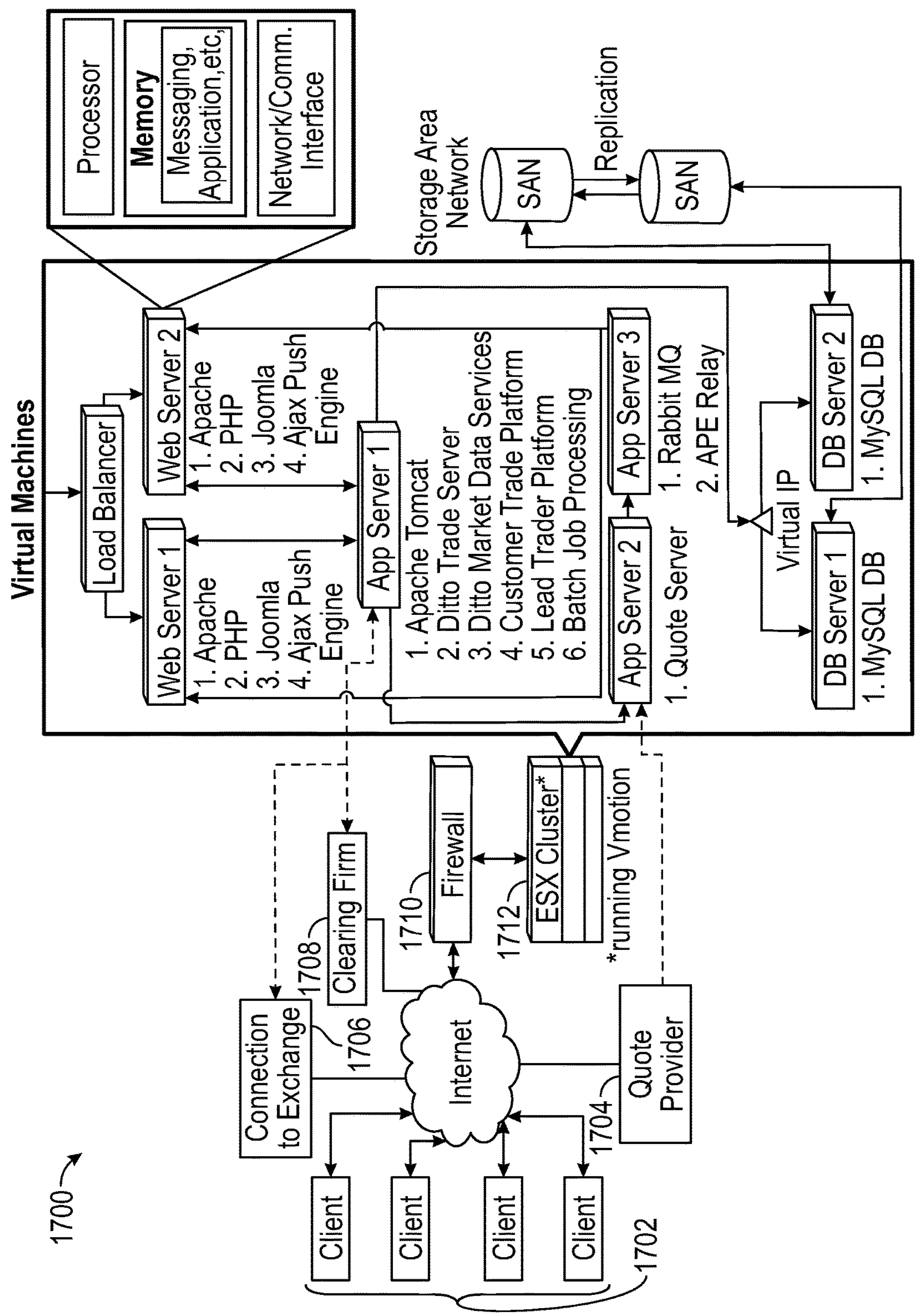
FIG. 17 is a system diagram of an embodiment of a System for Automated Trade Bundling and Detachment.

FIG. 17 is a system diagram of an embodiment of a System for Automated Trade Bundling and Detachment 1700. The System for Automated Trade Bundling and Detachment 1700 may include one or more client computers 1702, a quote provider 1704, a connection to an Exchange 1706, a clearing firm 1708, a firewall 1710, and a server cluster 1712.

The client computers 1702 may be in communication with the connection to an Exchange 1706. The clearing firm 1708 may be in communication with the connection to an Exchange 1706. The quote provider 1704 may be in communication with the connection to an Exchange 1706. The Connection to an Exchange 1706 may be in communication with the Firewall 1710. The Firewall may be in communication with the server cluster 1712.

The client computers 1702 may include any computing device with a network communication interface capable of communicating with, for example, the Connection to an Exchange 1706.

The quote provider 1704 may include any computing device with a network communication interface capable of communicating with, for example, the Connection to an Exchange 1706. In another embodiment, the quote provider 1704 may include a server with a network communication interface.

The clearing firm 1708 may include any computing device with a network communication interface capable of communicating with, for example, the Connection to an Exchange 1706. In another embodiment, the clearing firm 1708 may include a server with a network communication interface.

The server cluster 1712 may include one or more servers. In an embodiment where the server cluster 1712 includes more than one server, each server may include a network communication interface to allow the servers to be networked. In one or more embodiments, each server may be a web server, load balancer, application server, or database server. Each server may be configured to support Apache, PHP, Joomla, Ajax Push Engine, Apache Tomcat, Ditto Trade server, Ditto Market Data services, Customer Trade platform, Lead Trader platform, Batch Job processing, a quote server, Rabbit MQ, APE Relay, Virtula IP, or MySQL databases. In one or more embodiments, each server may include a processor, memory, and a network communications interface. The memory may store any of the applications that are run by the server cluster 1712.

The Connection to an Exchange 1706 may include the internet. In another embodiment the Connection to an Exchange 1706 may include local area network, wide area network, or other communications network.

FIG. 18 is an alternative embodiment of a Lead Trader Dashboard 1800. Lead Trader Dashboard 1800 includes a Buying Power section 1802, a Trade Entry section 1804, an Open Orders section 1806, a Current Positions section 1808, a Daily Transactions section 1810, a Daily Gain/Loss section 1812, and a Markets section 1814.

The Buying Power section 1802 includes Cash, Margin, Day Trading, Current Account Value, and Start of Day Account Value information.

The Trade Entry section 1804 includes Share Symbol, Last Price, Price Change, Bid, Ask, Share Number, Order, Price Type, Entry, Stop, and Target information as well as a Submit button and a Cancel button for each entry.

Open Orders section 1806 includes Share Symbol, Share Quantity, Filled Quantity, Last Price, Price Change, Order Type, Price Type, Price, Stop Limit, Tim Force, and Status information as well as an Update button and a Cancel button for each entry.

Current Positions section 1808 includes Share Symbol, Share Quantity, Last Price, Price Change, Bid, Ask, Entry, Stop, Stop Limit, Target, and Loss/Gain information as well as an Update button and Close Market button for each entry.

Daily Transactions section 1810 includes Tim, Share Symbol, Share Quantity, Type, Price, Average Price, Amount, Status, and TIF information for each entry.

Daily Gain/Loss section 1812 includes Unrealized Gain/Loss, Realized Gain/Loss, and Total Gain/Loss information.

Markets section 1814 includes Dow Jones, S&P 500, and NASDAQ information.

Figure 19:
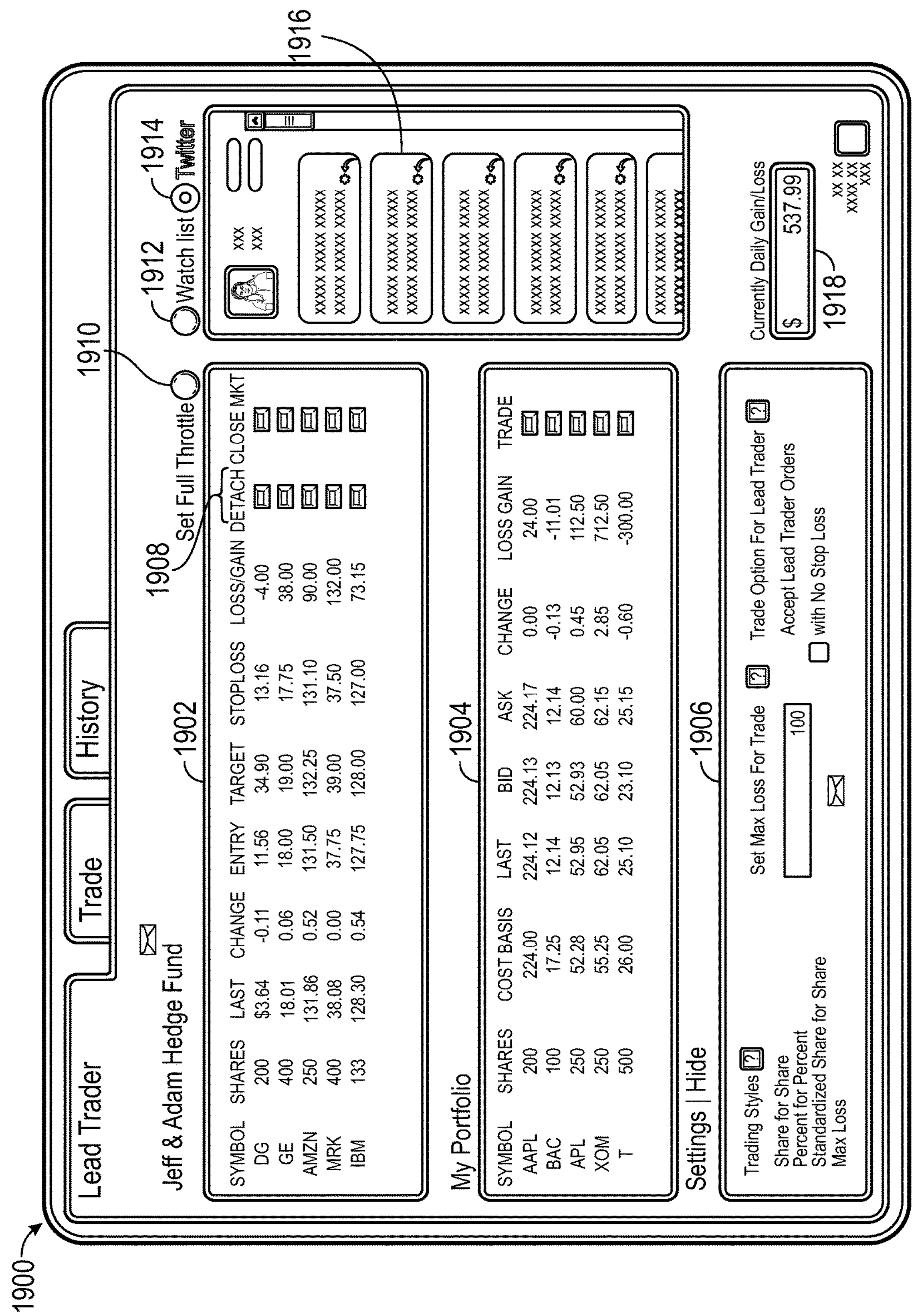
FIG. 19 is an alternative embodiment of a Follower Dashboard.

FIG. 19 is an alternative embodiment of a Follower Dashboard 1900.

Follower Dashboard 1900 includes a Lead Trader section 1902, a My Portfolio section 1904, a Settings section 1906, a Detach button 1908, a Set Full Throttle button 1910, a Watch List button 1912, a Twitter button 1914, a Message section 1916, and a Currently Daily Gain/Loss section 1918.

Lead Trader section 1902 includes Share Symbol, Share Number, Last Price, Price Change, Entry, Target, Stop/Loss, and Loss/Gain information as well as a Detach button 1908 and close market button for each entry.

My Portfolio section 1904 includes Share Symbol, Share Number, Cost Basis, Last, Bid, Ask, Change, and Loss/Gain information as well as a Trade button for each entry.

Settings section 1906 includes Trading Style, which may be share for share, percent for percent, standardized share for share, and max loss, Set Max Loss Per Trade, and Trade Options for Lead Trader which may include an Accept Lead Trader Orders with No Stop Loss button.

Set Full Throttle button 1910 allows the Follower to fully follow the Lead Trader.

The Watch List button 1912 allows the Follower to view Watch List information in the Message section 1916. The Twitter button 1914 allows the Follower to view a Twitter feed in the Message section 1916.

In one or more embodiments described above, a Lead Trader Computer and/or a Follower Computer each may include a laptop computer, desktop computer, workstation, multiprocessor, or other computing device including at least a monitor, an input device such as a keyboard, at least one processor, at least one memory, a communications network interface for sending and receiving communications from a network, an input interface for receiving communications from an input device such as a keyboard or mouse, and an output interface for communications with an output device such as a monitor.

In one or more embodiments described above, a Dashboard Generation System may include a set of instructions stored in a memory in communication with a processor that, when executed by the processor, instructs the processor to perform the instructions. In one or more embodiments, a Dashboard Generation System may be stored on a server, a plurality of servers, a mobile server, a desktop computer, a workstation, a laptop computer, in a cloud computing network, or other similar computing device with a communications network interface.

In one or more embodiments described above, a Trade Determination System may include a set of instructions stored in a memory in communication with a processor that, when executed by the processor, instructs the processor to perform the instructions. In one or more embodiments, a Trade Determination System may be stored on a server, a plurality of servers, a mobile server, a desktop computer, a workstation, a laptop computer, in a cloud computing network, or other similar computing device with a communications network interface.

In one or more embodiments described above, an Exchange may include a set of instructions stored in a memory in communication with a processor that, when executed by the processor, instructs the processor to perform the instructions. In one or more embodiments, an Exchange may be stored on a server, a plurality of servers, a mobile server, a desktop computer, a workstation, a laptop computer, in a cloud computing network, or other similar computing device with a communications network interface.

In one or more embodiments described above, a Messaging System may include a set of instructions stored in a memory in communication with a processor that, when executed by the processor, instructs the processor to perform the instructions. In one or more embodiments, a Messaging System may be stored on a server, a plurality of servers, a mobile server, a desktop computer, a workstation, a laptop computer, in a cloud computing network, or other similar computing device with a communications network interface.

In one or more embodiments described above, a Lead Trader-Follower Management System may include a set of instructions stored in a memory in communication with a processor that, when executed by the processor, instructs the processor to perform the instructions. In one or more embodiments, a Lead Trader-Follower Management System may be stored on a server, a plurality of servers, a mobile server, a desktop computer, a workstation, a laptop computer, in a cloud computing network, or other similar computing device with a communications network interface.

In one or more embodiments described above, a Stock Quote System may include a set of instructions stored in a memory in communication with a processor that, when executed by the processor, instructs the processor to perform the instructions. In one or more embodiments, a Lead Trader-Follower Management System may be stored on a server, a plurality of servers, a mobile server, a desktop computer, a workstation, a laptop computer, in a cloud computing network, or other similar computing device with a communications network interface.

In one or more embodiments described above, a Lead Trader Account Database, Follower Account Database and/or Follower Contact Database each may be an electronic database.

In one or more embodiments described above, the communication between a Lead Trader Computer and a Dashboard Generation System may be through a network connection, Ethernet connection, internet connection, file transfer protocol connection, RF connection, infrared connection, wireless connection, or other electronic connection.

In one or more embodiments described above, the communication between a Follower Computer and a Dashboard Generation System may be through a network connection, Ethernet connection, internet connection, file transfer protocol connection, RF connection, infrared connection, wireless connection, or other electronic connection.

In one or more embodiments described above, the communication between a Stock Quote System and a Dashboard Generation System may be through a network connection, Ethernet connection, internet connection, file transfer protocol connection, RF connection, infrared connection, wireless connection, or other electronic connection.

In one or more embodiments described above, the communication between a Trade Determination System and a Dashboard Generation System may be through a network connection, Ethernet connection, internet connection, file transfer protocol connection, RF connection, infrared connection, wireless connection, or other electronic connection.

In one or more embodiments described above, the communication between a Trade Determination System and an Exchange may be through a network connection, Ethernet connection, internet connection, file transfer protocol connection, RF connection, infrared connection, wireless connection, or other electronic connection.

In one or more embodiments described above, the communication between a Lead Trader Computer and a Lead Trader-Follower Management System may be through a network connection, Ethernet connection, internet connection, file transfer protocol connection, RF connection, infrared connection, wireless connection, or other electronic connection.

In one or more embodiments described above, the communication between a Follower Computer and a Lead Trader-Follower Management System may be through a network connection, Ethernet connection, internet connection, file transfer protocol connection, RF connection, infrared connection, wireless connection, or other electronic connection.

In one or more embodiments described above, the communication between a Lead Trader-Follower Management System and a Dashboard Generation System may be through a network connection, Ethernet connection, internet connection, file transfer protocol connection, RF connection, infrared connection, wireless connection, or other electronic connection.

In one or more embodiments described above, the communication between a Trade Determination System and a Messaging System may be through a network connection, Ethernet connection, internet connection, file transfer protocol connection, RF connection, infrared connection, wireless connection, or other electronic connection.

In one or more embodiments described above, the communication between a Follower Computer and a Messaging System may be through a network connection, Ethernet connection, internet connection, file transfer protocol connection, RF connection, infrared connection, wireless connection, or other electronic connection.

In one or more embodiments described above, the communication between a Dashboard Generation System and a Lead Trader Account Database may be through a network connection, SQL connection, Ethernet connection, internet connection, file transfer protocol connection, RF connection, infrared connection, wireless connection, or other electronic connection.

In one or more embodiments described above, the communication between a Dashboard Generation System and a Follower Account Database may be through a network connection, SQL connection, Ethernet connection, internet connection, file transfer protocol connection, RF connection, infrared connection, wireless connection, or other electronic connection.

In one or more embodiments described above, the communication between a Trade Determination System and a Lead Trader Account Database may be through a network connection, SQL connection, Ethernet connection, internet connection, file transfer protocol connection, RF connection, infrared connection, wireless connection, or other electronic connection.

In one or more embodiments described above, the communication between a Trade Determination System and a Follower Account Database may be through a network connection, SQL connection, Ethernet connection, internet connection, file transfer protocol connection, RF connection, infrared connection, wireless connection, or other electronic connection.

In one or more embodiments described above, the communication between a Messaging System and a Follower Contact Database may be through a network connection, SQL connection, Ethernet connection, internet connection, file transfer protocol connection, RF connection, infrared connection, wireless connection, or other electronic connection.

Any references to specific stock, share, or security identifiers in the drawings or in the specification are not limiting to the stock, share, or security identified. Any security can be traded using the system and methods described above.

While particular elements, embodiments, and applications of the present invention have been shown and described, it is understood that the invention is not limited to the elements, embodiments, and applications described because modifications may be made by those skilled in the art, particularly in light of the teachings of this disclosure. It is therefore contemplated by the appended claims to cover such modifications and incorporate those features which come within the spirit and scope of the invention.

The invention claimed is:

1. A system for automated securities trading, said system including:

a lead trader account database including a plurality of data structures each having a lead trader identification data electronically associated with data representing a plurality of trade follower identities;

a follower account database including at least one data structure electronically associated with a trade follower identity and including trade follower account data associated with said trade follower identity; and an automated computerized trade determination system, wherein said automated computerized trade determination system electronically receives an electronic trade initiation command including data representing a lead trader desired trade including lead trader identification data, a lead trader share identification data, a lead trader share number data, and a share price data, wherein, in response to the receipt of said electronic trade initiation command, said automated computerized trade determination system automatically uses said lead trader identification data to retrieve, from said lead trader account database, a plurality of electronic trade follower identities previously associated with said lead trader identification data, wherein said automated computerized trade determination system uses said plurality of electronic follower identities to retrieve, from said follower account database, trade follower account data including an available follower account balance associated with each of said plurality of electronic follower identities, wherein said trade determination system sets a follower share number data equal to said lead trader share number data and multiplies said follower share number data with said share price data to determine a follower trade total price, wherein said trade determination system sets an initial total trade share number equal to said lead trader share number data, wherein, for each of said plurality of electronic follower identities, when said available follower account balance is electronically determined to be at least equal to said follower trade total price, said trade determination system increments said initial total trade share number by said follower share number, and wherein, for each of said plurality of electronic follower identities, when said available follower account balance is electronically determined to be less than said follower trade total price said trade determination system divides said available follower account balance by said share price data to determine a reduced follower share number data for said follower identity and then increments said initial total trade share number by said reduced follower share number data, wherein a final incremented value of said initial total trade share number is set as a total trade share number in real time, wherein said trade determination system automatically electronically submits said lead trader share identification data and said total trade share number to an exchange for execution as a single trade in real time, and wherein the shares obtained though said single trade are automatically electronically allocated to both a lead trader account in said lead trader database according to said lead trader share number and into a follower account in said follower account database associated with each of said plurality of electronic follower identities according to said follower share number.

2. The system of claim 1 further including a dashboard generation system providing a graphical user interface to at least one of a follower computer and a lead trader computer.

3. The system of claim 1 wherein, in response to receiving said total trade share number, said exchange performs a first trade of a first number of shares at a first price and a second trade of a second number of shares at a second price, wherein said first number of shares plus said second number of shares equals said total trade share number.

4. The system of claim 3 wherein said trade determination system receives said first number of shares, said first price, said second number of shares, and said second price, and uses them to determine an average share price for the total trade share number.

5. The system of claim 4 wherein said average share price is recorded as the share price for the trade for both said lead trader account database and said follower account database.

* * * * *